US010239353B2

(12) United States Patent
Ito

(10) Patent No.: US 10,239,353 B2
(45) Date of Patent: Mar. 26, 2019

(54) PNEUMATIC TIRE

(71) Applicant: The Yokohama Rubber Co., LTD., Minato-ku, Tokyo (JP)

(72) Inventor: Takanori Ito, Hiratsuka (JP)

(73) Assignee: The Yokohama Rubber Co., LTD., Minato-ku, Tokyo (JP)

( * ) Notice: Subject to any disclaimer, the term of this patent is extended or adjusted under 35 U.S.C. 154(b) by 324 days.

(21) Appl. No.: 14/655,650

(22) PCT Filed: Dec. 28, 2012

(86) PCT No.: PCT/JP2012/084221
§ 371 (c)(1),
(2) Date: Jun. 25, 2015

(87) PCT Pub. No.: WO2014/103070
PCT Pub. Date: Jul. 3, 2014

(65) Prior Publication Data
US 2015/0336428 A1  Nov. 26, 2015

(51) Int. Cl.
*B60C 11/02* (2006.01)
*B60C 11/03* (2006.01)
(Continued)

(52) U.S. Cl.
CPC ............... *B60C 11/02* (2013.01); *B60C 5/00* (2013.01); *B60C 9/185* (2013.01); *B60C 9/20* (2013.01);
(Continued)

(58) Field of Classification Search
CPC ......... B60C 2200/06; B60C 2011/0033; B60C 2011/0355; B60C 2011/0369;
(Continued)

(56) References Cited

U.S. PATENT DOCUMENTS 3,939,890 A * 2/1976 Abe ..................... B60C 11/00
152/209.13
4,215,734 A * 8/1980 Suzuki .................. B60C 9/18
152/209.1
(Continued)

FOREIGN PATENT DOCUMENTS

CN    1498171            5/2004
DE    102008055498 A1 *  6/2010  ............. B60C 11/00
(Continued)

OTHER PUBLICATIONS

International Search Report for International Application No. PCT/JP2012/084221 dated Mar. 19, 2013, 4 pages, Japan.

*Primary Examiner* — Joseph S Del Sole
*Assistant Examiner* — Cedrick S Williams
(74) *Attorney, Agent, or Firm* — Thorpe North & Western

(57) ABSTRACT

The pneumatic tire includes at least three circumferential main grooves extending in the tire circumferential direction and a plurality of land portions partitioned and formed by the circumferential main grooves. Also, the belt layer is formed by laminating a pair of cross belts having a belt angle, as an absolute value, of not less than 10° and not more than 45° and of mutually opposite signs, and a circumferential reinforcing layer having a belt angle within a range of ±5° with respect to the tire circumferential direction. Also, when viewed as a cross-section from the tire meridian direction, the distance Dcc on the tire equatorial plane from the circumferential reinforcing layer to the wear end surface and the distance De from the end portion of the circumferential reinforcing layer to the wear end surface have a relationship such that 1.06≤De/Dcc.

29 Claims, 18 Drawing Sheets

(51) Int. Cl.
  B60C 5/00  (2006.01)
  B60C 9/20  (2006.01)
  B60C 9/18  (2006.01)
  B60C 11/01 (2006.01)
  B60C 9/28  (2006.01)
  B60C 11/00 (2006.01)

(52) U.S. Cl.
  CPC ............. B60C 9/28 (2013.01); B60C 11/01 (2013.01); B60C 11/03 (2013.01); *B60C 2011/0033* (2013.01); *B60C 2200/06* (2013.01)

(58) Field of Classification Search
  CPC ..... B60C 2011/0351; B60C 2011/0339; B60C 9/185; B60C 9/2204; B60C 9/22; B60C 11/02
  See application file for complete search history.

(56) References Cited

U.S. PATENT DOCUMENTS

| | | | |
|---|---|---|---|
| 5,355,922 A * | 10/1994 | Kogure | B60C 9/26 |
| | | | 152/209.18 |
| 6,401,778 B1 | 6/2002 | Cluzel | |
| 6,880,599 B2 | 4/2005 | Maruoka et al. | |
| 8,162,018 B2 | 4/2012 | Suzuki et al. | |
| 9,150,052 B2 | 10/2015 | Mashiyama | |
| 2004/0069392 A1* | 4/2004 | Maruoka | B60C 3/04 |
| | | | 152/454 |
| 2005/0000631 A1* | 1/2005 | Salo | B60C 11/00 |
| | | | 152/209.1 |
| 2005/0006016 A1* | 1/2005 | Ooyama | B60C 11/01 |
| | | | 152/209.16 |
| 2005/0016656 A1* | 1/2005 | Kuroki | B60C 11/00 |
| | | | 152/548 |
| 2006/0169380 A1 | 8/2006 | Radulescu et al. | |
| 2006/0169381 A1* | 8/2006 | Radulescu | B60C 9/2006 |
| | | | 152/531 |
| 2006/0169383 A1 | 8/2006 | Radulescu et al. | |
| 2009/0277557 A1* | 11/2009 | Suzuki | B60C 9/2006 |
| | | | 152/532 |
| 2012/0097307 A1 | 4/2012 | Delebecq et al. | |
| 2012/0194076 A1 | 8/2012 | Murata | |
| 2014/0305566 A1* | 10/2014 | Mashiyama | B60C 9/18 |
| | | | 152/454 |
| 2014/0326375 A1* | 11/2014 | Okabe | B60C 9/0007 |
| | | | 152/154.2 |
| 2014/0326380 A1 | 11/2014 | Kotoku | |

FOREIGN PATENT DOCUMENTS

| | | | | |
|---|---|---|---|---|
| DE | 102008055498 A1 * | 6/2010 | ............ | B60C 11/00 |
| JP | 62-015104 * | 1/1987 | ............... | B60C 1/00 |
| JP | 62015104 A * | 1/1987 | | |
| JP | 63-068405 * | 3/1988 | ............ | B60C 11/00 |
| JP | 63068405 A * | 3/1988 | ........... | B60C 11/005 |
| JP | 2001-130219 | 5/2001 | | |
| JP | 2002-087019 | 3/2002 | | |
| JP | 2003-080906 | 3/2003 | | |
| JP | 2005-219512 | 8/2005 | | |
| JP | 4008013 | 11/2007 | | |
| JP | 2008-001264 | 1/2008 | | |
| JP | 2008-074250 | 4/2008 | | |
| JP | 4354114 | 10/2009 | | |
| JP | 4642760 | 3/2011 | | |
| JP | 4663638 | 4/2011 | | |
| JP | 4663639 | 4/2011 | | |
| JP | 4918948 | 4/2012 | | |
| JP | 4918948 B1 * | 4/2012 | ............... | B60C 9/18 |
| JP | 4918948 B1 * | 4/2012 | ............... | B60C 9/18 |
| JP | 4984013 | 7/2012 | | |
| JP | 2012-144096 | 8/2012 | | |
| JP | 2012-522686 | 9/2012 | | |
| JP | 5029787 | 9/2012 | | |
| JP | 5029787 B1 * | 9/2012 | ........... | B60C 9/0007 |
| JP | 5029787 B1 * | 9/2012 | ........... | B60C 9/0007 |
| WO | WO 9924269 | 5/1999 | | |
| WO | WO 2003/051651 | 6/2003 | | |
| WO | WO 2005/016661 | 2/2005 | | |
| WO | WO 2005/016666 | 2/2005 | | |
| WO | WO 2005/016667 | 2/2005 | | |
| WO | WO 2005/016668 | 2/2005 | | |
| WO | WO 2007/148447 | 12/2007 | | |
| WO | WO2007148447 | 12/2007 | | |
| WO | WO 2010/115891 | 10/2010 | | |
| WO | WO 2013/042254 | 3/2013 | | |
| WO | WO 2013/042255 | 3/2013 | | |
| WO | WO 2013/042256 | 3/2013 | | |

* cited by examiner

COMPARATIVE EXAMPLE
(De/Dcc=1.00, Gsh/Gcc=1.06)

WORKING EXAMPLE
(De/Dcc=1.08, Gsh/Gcc=1.20)

| | CONVENTIONAL EXAMPLE | COMPARATIVE EXAMPLE 1 | COMPARATIVE EXAMPLE 2 | WORKING EXAMPLE 1 | WORKING EXAMPLE 2 | WORKING EXAMPLE 3 | WORKING EXAMPLE 4 |
|---|---|---|---|---|---|---|---|
| PRESENCE OF CIRCUMFERENTIAL REINFORCING LAYER | NO | YES | YES | YES | YES | YES | YES |
| De/Dcc | - | 1.00 | 1.00 | 1.06 | 1.08 | 1.06 | 1.10 |
| Gsh/Gcc | 1.06 | 1.06 | 1.24 | 1.10 | 1.20 | 1.20 | 1.25 |
| UDsh/GDsh | 0.17 | 0.17 | 0.17 | 0.17 | 0.17 | 0.20 | 0.20 |
| UDcc/GDcc | 0.17 | 0.17 | 0.17 | 0.17 | 0.17 | 0.17 | 0.17 |
| ΔDrg/UDsh | 0.0 | 0.0 | 0.0 | 0.0 | 0.0 | 0.0 | 0.0 |
| Drg/(GDsh+UDsh) | 0.65 | 0.65 | 0.65 | 0.65 | 0.65 | 0.65 | 0.65 |
| Ws/TW | - | 0.65 | 0.65 | 0.65 | 0.65 | 0.65 | 0.65 |
| TW/SW | 0.92 | 0.92 | 0.92 | 0.92 | 0.92 | 0.92 | 0.92 |
| TW/Wca | 0.96 | 0.96 | 0.96 | 0.93 | 0.93 | 0.93 | 0.93 |
| YIELD OF BASE TIRES [%] | 70 | 72 | 76 | 78 | 80 | 82 | 83 |

FIG. 15A

|  | WORKING EXAMPLE 5 | WORKING EXAMPLE 6 | WORKING EXAMPLE 7 | WORKING EXAMPLE 8 | WORKING EXAMPLE 9 | WORKING EXAMPLE 10 | WORKING EXAMPLE 11 |
|---|---|---|---|---|---|---|---|
| PRESENCE OF CIRCUMFERENTIAL REINFORCING LAYER | YES | YES | YES | YES | YES | YES | YES |
| De/Dcc | 1.10 | 1.10 | 1.10 | 1.10 | 1.10 | 1.10 | 1.10 |
| Gsh/Gcc | 1.25 | 1.25 | 1.25 | 1.25 | 1.25 | 1.25 | 1.25 |
| UDsh/GDsh | 0.30 | 0.30 | 0.30 | 0.30 | 0.30 | 0.30 | 0.30 |
| UDcc/GDcc | 0.17 | 0.20 | 0.30 | 0.30 | 0.30 | 0.20 | 0.30 |
| ΔDrg/UDsh | 0.0 | 0.0 | 0.0 | 1.0 | -1.0 | 0.0 | 0.0 |
| Drg/(GDsh+UDsh) | 0.65 | 0.65 | 0.65 | 0.65 | 0.65 | 0.70 | 0.70 |
| Ws/TW | 0.65 | 0.65 | 0.65 | 0.65 | 0.65 | 0.65 | 0.65 |
| TW/SW | 0.92 | 0.92 | 0.92 | 0.92 | 0.92 | 0.92 | 0.92 |
| TW/Wca | 0.93 | 0.93 | 0.93 | 0.93 | 0.93 | 0.93 | 0.93 |
| YIELD OF BASE TIRES [%] | 84 | 86 | 87 | 92 | 85 | 95 | 98 |

FIG. 15B

| | WORKING EXAMPLE 12 | WORKING EXAMPLE 13 | WORKING EXAMPLE 14 | WORKING EXAMPLE 15 | WORKING EXAMPLE 16 | WORKING EXAMPLE 17 | WORKING EXAMPLE 18 | WORKING EXAMPLE 19 |
|---|---|---|---|---|---|---|---|---|
| PRESENCE OF CIRCUMFERENTIAL REINFORCING LAYER | YES | YES | YES | YES | YES | YES | YES | YES |
| De/Dcc | 1.10 | 1.10 | 1.10 | 1.10 | 1.10 | 1.10 | 1.10 | 1.10 |
| Gsh/Gcc | 1.25 | 1.25 | 1.25 | 1.10 | 1.20 | 1.25 | 1.25 | 1.25 |
| UDsh/GDsh | 0.30 | 0.30 | 0.30 | 0.30 | 0.30 | 0.30 | 0.30 | 0.30 |
| UDcc/GDcc | 0.30 | 0.30 | 0.30 | 0.30 | 0.30 | 0.30 | 0.30 | 0.30 |
| ΔDrg/UDsh | 0.0 | 0.0 | 0.0 | 0.0 | 0.0 | 0.0 | 0.0 | 0.0 |
| Drg/(GDsh + UDsh) | 0.90 | 1.10 | 1.20 | 0.90 | 0.90 | 0.90 | 0.90 | 0.90 |
| Ws/TW | 0.65 | 0.65 | 0.65 | 0.70 | 0.70 | 0.70 | 0.80 | 0.90 |
| TW/SW | 0.92 | 0.92 | 0.92 | 0.92 | 0.92 | 0.92 | 0.92 | 0.92 |
| TW/Wca | 0.93 | 0.93 | 0.93 | 0.93 | 0.93 | 0.93 | 0.93 | 0.93 |
| YIELD OF BASE TIRES [%] | 98 | 98 | 98 | 100 | 100 | 100 | 100 | 100 |

FIG. 16A

| | WORKING EXAMPLE 20 | WORKING EXAMPLE 21 | WORKING EXAMPLE 22 | WORKING EXAMPLE 23 | WORKING EXAMPLE 24 | WORKING EXAMPLE 25 | WORKING EXAMPLE 26 |
|---|---|---|---|---|---|---|---|
| PRESENCE OF CIRCUMFERENTIAL REINFORCING LAYER | YES | YES | YES | YES | YES | YES | YES |
| De/Dcc | 1.10 | 1.10 | 1.10 | 1.10 | 1.10 | 1.10 | 1.10 |
| Gsh/Gcc | 1.25 | 1.10 | 1.10 | 1.10 | 1.10 | 1.10 | 1.10 |
| UDsh/GDsh | 0.30 | 0.30 | 0.30 | 0.30 | 0.30 | 0.30 | 0.30 |
| UDcc/GDcc | 0.30 | 0.30 | 0.30 | 0.30 | 0.30 | 0.30 | 0.30 |
| ΔDrg/UDsh | 0.0 | 0.0 | 0.0 | 0.0 | 0.0 | 0.0 | 0.0 |
| Drg/(GDsh + UDsh) | 0.90 | 0.90 | 0.90 | 0.90 | 0.90 | 0.90 | 0.90 |
| Ws/TW | 0.95 | 0.95 | 0.95 | 0.95 | 0.95 | 0.95 | 0.95 |
| TW/SW | 0.92 | 0.92 | 0.80 | 0.87 | 0.89 | 0.87 | 0.87 |
| TW/Wca | 0.93 | 0.93 | 0.93 | 0.93 | 0.93 | 0.91 | 0.82 |
| YIELD OF BASE TIRES [%] | 100 | 100 | 100 | 100 | 100 | 100 | 100 |

FIG. 16B

PNEUMATIC TIRE

TECHNICAL FIELD

The present technology relates to a pneumatic tire, and more particularly relates to a pneumatic tire capable of improving the yield of base tires used in retread tires.

BACKGROUND

Recent heavy duty tires mounted on trucks, buses, and the like maintain the shape of the tread portion due to the tires having a low aspect ratio while having a circumferential reinforcing layer disposed in the belt layer. The circumferential reinforcing layer is a belt ply having a belt angle that is substantially 0° with respect to the tire circumferential direction, and is disposed so as to be laminated with a pair of cross belts. The technologies disclosed in Japanese Patent Nos. 4642760, 4663638 and 4663639, as well as in Japanese Unexamined Patent Application Publication No. 2012-522686, are conventional pneumatic tires that are configured in this manner.

Also, in recent years, retread tires have been gaining interest from the viewpoint of price and environment. Retread tires are tires where the remaining grooves have reached the end of their service live and the tread rubber is replaced so that the tire can be reused. They are produced by two methods, the pre-cure method and the remold method. Retread tires by the pre-cure method are produced by removing the tread rubber of the used tire by a buffing process to form a base tire, and a vulcanized pre-cured tread having the tread pattern of the original product is bonded to the base tire. Retread tires by the remold method are produced by removing the tread rubber of the used tire by a buffing process to form a base tire, then winding unvulcanized tread rubber around the base tire, and carrying out vulcanization molding using a molding die having the tread pattern.

For these retread tires, there is a demand to improve the yield of base tires.

SUMMARY

The present technology provides a pneumatic tire capable of improving the yield of base tires used in retread tires.

A pneumatic tire according to the present technology includes: a carcass layer; a belt layer disposed on an outer side in a tire radial direction of the carcass layer; a tread rubber disposed on an outer side in the tire radial direction of the belt layer; at least three circumferential main grooves extending in a tire circumferential direction; and a plurality of land portions defined by the circumferential main grooves. The belt layer is formed by laminating a pair of cross belts having a belt angle, as an absolute value, of not less than 10° and not more than 45° and of mutually opposite signs, and a circumferential reinforcing layer having a belt angle within a range of ±5° with respect to the tire circumferential direction. When viewed as a cross-section from the tire meridian direction, when a wear end surface WE of the circumferential main grooves is drawn, a distance Dcc on the tire equatorial plane CL from the circumferential reinforcing layer to the wear end surface WE and a distance De from the end portion of the circumferential reinforcing layer to the wear end surface WE have a relationship such that $1.06 \leq De/Dcc$.

In the pneumatic tire according to the present technology, the distances Dcc, De of the circumferential reinforcing layer with respect to the wear end surface WE are made appropriate, so compared with a configuration in which the values of the ratio De/Dcc are equal, the ground contact pressure of the shoulder land portions when the tire makes ground contact is increased. Also, radial growth of the tire in the region to the outer side in the tire width direction from the circumferential reinforcing layer is reduced, so the deformation of the belt layer is suppressed. As a result, exposure of the belt layer during the buffing operation of the used tire is suppressed, which has the advantage that the yield of base tires is increased.

BRIEF DESCRIPTION OF THE DRAWINGS

FIGS. 15A-15B include a table showing results of performance testing of pneumatic tires according to embodiments of the present technology.

FIGS. 16A-16B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
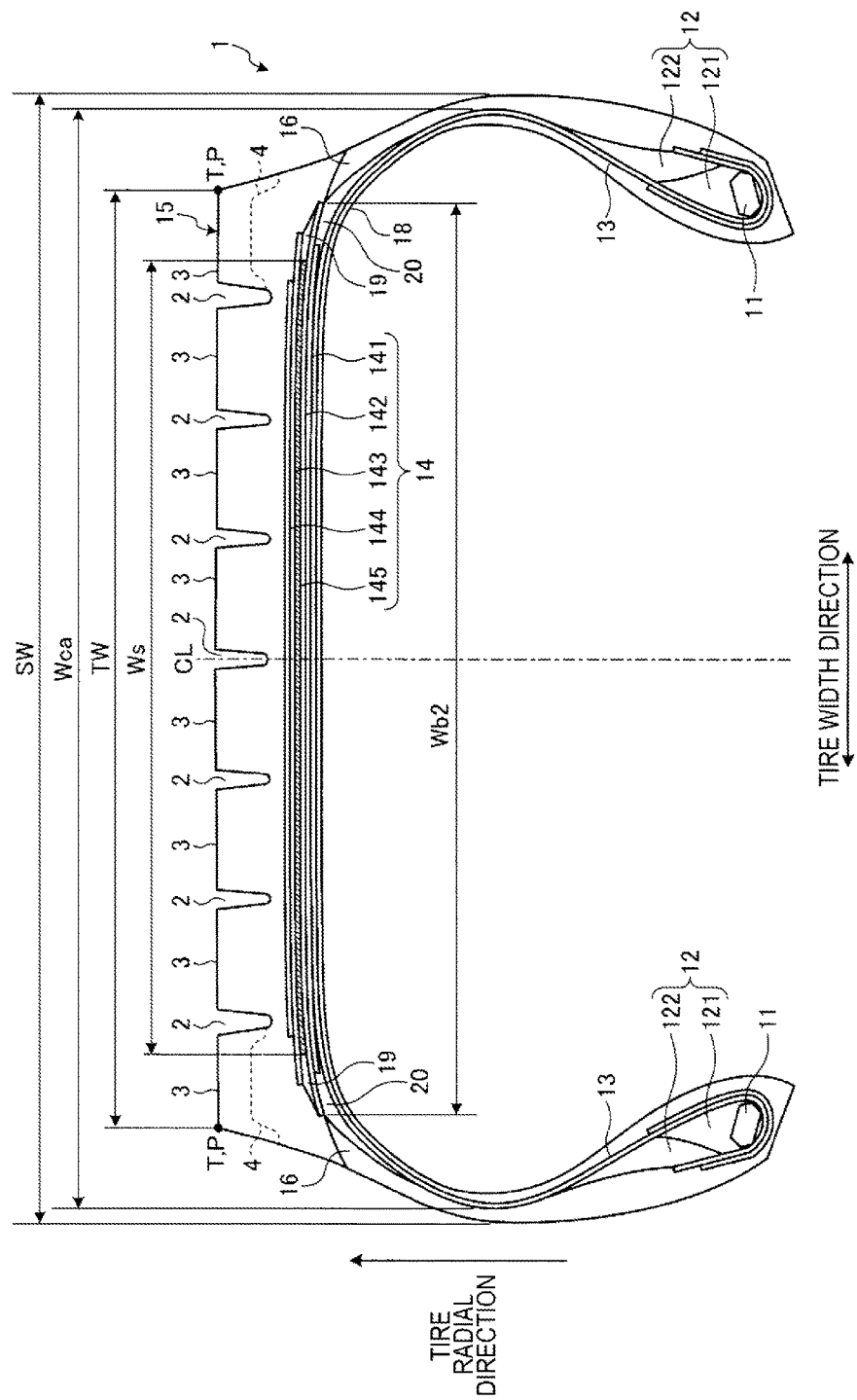
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. In this drawing, a radial tire for heavy loads that is mounted on trucks, buses, and the like for long-distance transport is illustrated as an example of the pneumatic tire 1. Note that the symbol CL refers to a tire equatorial plane. Moreover, a tread edge P and a tire ground contact edge T are in accord with each other in FIG. 1. The circumferential reinforcing layer 145 in FIG. 1 is indicated by hatching.

A pneumatic tire 1 includes a pair of bead cores 11, 11, a pair of bead fillers 12, 12, a carcass layer 13, a belt layer 14, tread rubber 15, and a pair of side wall rubbers 16, 16 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fiber material (e.g. nylon, polyester, rayon, or the like) covered by a coating rubber and subjected to a rolling process, and has a carcass angle (inclination angle of the fiber direction of the carcass cord with respect to the tire circumferential direction), as an absolute value, of not less than 85° and not more than 95°.

The belt layer 14 is formed by laminating a plurality of belt plies 141 to 145, and disposed to extend over a periphery of the carcass layer 13. A detailed configuration of the belt layer 14 is described below.

The tread rubber 15 is disposed on an outer periphery in the tire radial direction of the carcass layer 13 and the belt layer 14, and forms a tread portion of the tire. The pair of side wall rubbers 16, 16 is disposed on both outer sides of the carcass layer 13 in the tire width direction, so as to form left and right side wall portions of the tire.

In the configuration illustrated in FIG. 1, the pneumatic tire 1 includes seven circumferential main grooves 2 that extend in a tire circumferential direction, and eight land portions 3 partitioned and formed by the circumferential main grooves 2. Also, a plurality of lug grooves 4 extending in the tire width direction and opening into a buttress portion is provided in the left and right shoulder land portions 3. Also, each of the land portions 3 is a rib that is continuous in the tire circumferential direction, or, a block that is divided in the tire circumferential direction by the lug grooves 4.

Here, "circumferential main grooves" refers to circumferential grooves having a groove width of 5.0 mm or greater. The groove width of the circumferential main grooves is measured excluding the notched portions and/or the chamfered portions formed at the groove opening portion.

Additionally, in the pneumatic tire 1, the left and right outermost circumferential main grooves 2, 2 in the tire width direction are referred to as outermost circumferential main grooves. Moreover, the left and right land portions 3, 3 on the outer side in the tire width direction that are defined by the left and right outermost circumferential main grooves 2, 2 are referred to as shoulder land portions.

[Belt Layer]

Figure 2:
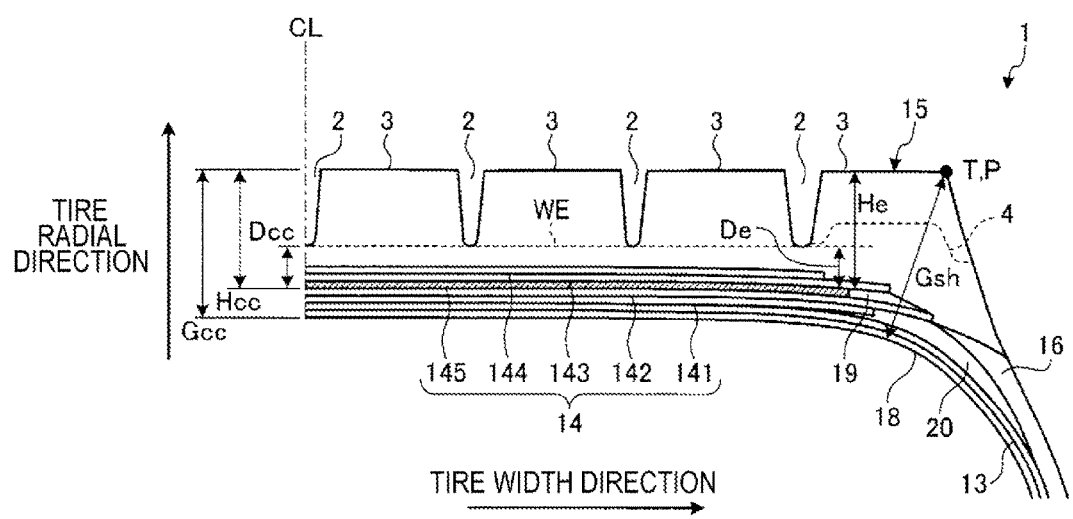
FIG. 2 is an explanatory view illustrating a belt layer of the pneumatic tire depicted in FIG. 1.
Figure 3:
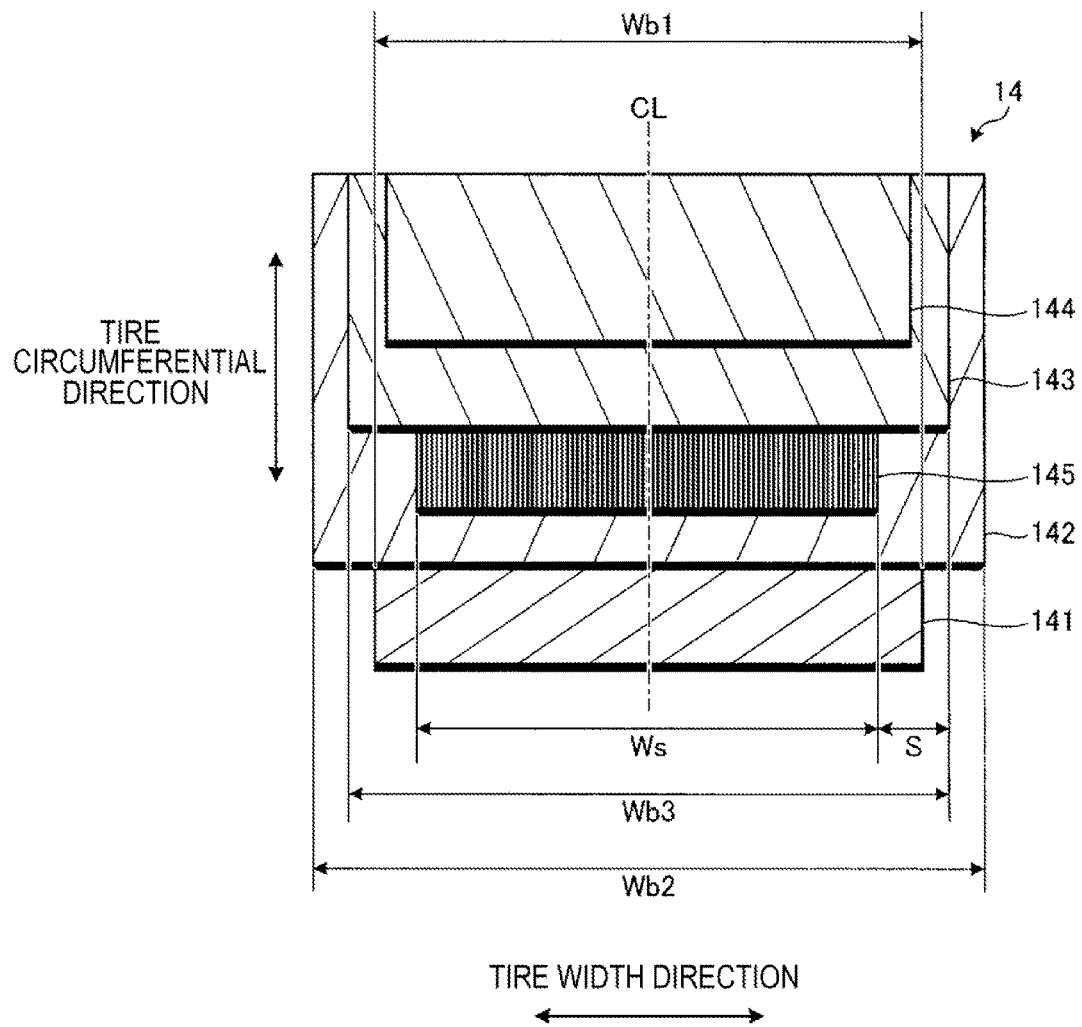
FIG. 3 is an explanatory view illustrating the belt layer of the pneumatic tire depicted in FIG. 1.

FIGS. 2 and 3 are explanatory views illustrating a belt layer of the pneumatic tire depicted in FIG. 1. Among these drawings, FIG. 2 illustrates an area on one side of a tread portion demarcated by the tire equatorial plane CL, and FIG. 3 illustrates a laminated structure of the belt layer 14. Furthermore, the thin lines in the belt plies 141 to 145 in FIG. 3 schematically represent the respective belt cords of the belt plies 141 to 145.

The belt layer 14 is formed by laminating a large angle belt 141, a pair of cross belts 142, 143, a belt cover 144, and a circumferential reinforcing layer 145, and is disposed by being wound and mounted onto the periphery of the carcass layer 13 (see FIG. 2).

The large angle belt 141 is configured by a plurality of belt cords formed from steel or organic fiber material, covered by coating rubber, and subjected to a rolling process, having a belt angle (angle of inclination of the fiber direction of the belt cords with respect to the tire circumferential direction), as an absolute value, of not less than 45° and not more than 70°. Moreover, the large angle belt 141 is disposed so as to be laminated outward in the tire radial direction of the carcass layer 13.

The pair of cross belts 142, 143 are configured by a plurality of belt cords formed from steel or organic fiber material, covered by coating rubber, and subjected to a rolling process, having a belt angle, as an absolute value, of not less than 10° and not more than 45°. Additionally, the pair of cross belts 142, 143 have belt angles that are of mutually opposite sign to each other, and are laminated so that the fiber directions of the belt cords intersect each other (a crossply structure). In the following description, the cross belt 142 positioned on the inner side in the tire radial direction is referred to as "inner-side cross belt", and the cross belt 143 positioned on the outer side in the tire radial direction is referred to as "outer-side cross belt". Three or more cross belts may be disposed so as to be laminated (not illustrated). Also, in the present embodiment, the pair of cross belts 142, 143 are disposed laminated on the outer side of the large angle belt 141 in the tire radial direction.

Also, the belt cover 144 is configured by a plurality of belt cords formed from steel or organic fiber material, covered by coating rubber, and subjected to a rolling process, having a belt angle, as an absolute value, of not less than 10° and not more than 45°. Also, the belt cover 144 is disposed laminated on the outer side in the tire radial direction of the pair of cross belts 142, 143. In this embodiment, the belt cover 144 has the same belt angle as the outer-side cross belt 143, and is disposed in the outermost layer of the belt layer 14.

The circumferential reinforcing layer 145 is configured by belt cords formed from steel, and covered by coating rubber that are wound in a spiral manner with an inclination within a range of ±5° with respect to the tire circumferential direction. Additionally, the circumferential reinforcing layer 145 is disposed interposed between the pair of cross belts 142, 143 in the present embodiment. Additionally, the circumferential reinforcing layer 145 is disposed inward in the tire width direction of left and right edges of the pair of cross belts 142, 143. Specifically, the circumferential reinforcing layer 145 is formed by winding one or a plurality of wires in a spiral manner around the periphery of the inner-side cross belt 142. This circumferential reinforcing layer 145 reinforces the rigidity in the tire circumferential direction. As a result, the tire durability is improved.

In the pneumatic tire 1, the belt layer 14 may have an edge cover (not illustrated). Generally, the edge cover is configured by a plurality of belt cords formed from steel or organic fiber material covered by coating rubber and subjected to a rolling process, having a belt angle, as an absolute value, of not less than 0° and not more than 5°. Additionally, edge covers are disposed outward in the tire radial direction of the left and right edges of the outer-side cross belt 143 (or the inner-side cross belt 142). The difference in radial growth between the center region and the shoulder region of the tread portion is reduced and uneven wear resistance of the tire is improved due to a hoop effect demonstrated by the edge covers.

Additionally, in the configuration in FIG. 2, the circumferential reinforcing layer 145 is disposed so as to be interposed between the pair of cross belts 142, 143 (see FIG. 2). However, the circumferential reinforcing layer 145 is not limited as such, and may also disposed on the outer side in the tire radial direction of the pair of cross belts 142, 143 (not illustrated). Additionally, the circumferential reinforcing layer 145 may also be disposed on the inner side of the pair of cross belts 142, 143. For example, the circumferential reinforcing layer 145 may be (1) disposed between the large angle belt 141 and the inner-side cross belt 142, or (2) disposed between the carcass layer 13 and the large angle belt 141 (not illustrated).

[Increasing the Yield of Base Tires]

Recent heavy duty tires mounted on trucks, buses, and the like maintain the shape of the tread portion due to the tires having a low aspect ratio while having a circumferential reinforcing layer disposed in the belt layer. Specifically, by disposing the circumferential reinforcing layer at the tread center region, and exploiting the hoop effect thereof, radial growth of the tread is suppressed and the tread shape is maintained.

In such a configuration having the circumferential reinforcing layer, as the rigidity of the belt layer in the tire circumferential direction is increased due to the circumferential reinforcing layer, there is a problem that separation of the peripheral rubber at the edge portion of the belt ply easily occurs. Such a problem clearly appears, in particular, under high internal pressure and heavy load long-term service conditions.

Also, in recent years, retread tires have been gaining interest from the viewpoint of cost and the environmental. Retread tires are tires where the remaining grooves have reached the end of their service live and the tread rubber is replaced so that the tire can be reused. They are produced by two methods, the pre-cure method and the remold method. Retread tires by the pre-cure method are produced by removing the tread rubber of the used tire by a buffing process to form a base tire, and a vulcanized pre-cured tread having the tread pattern of the original product is bonded to the base tire. Retread tires by the remold method are produced by removing the tread rubber of the used tire by a buffing process to form a base tire, then winding unvulcanized tread rubber around the base tire, and carrying out vulcanization molding using a molding die having the tread pattern.

Here, in the process to obtain the base tire, the buffing process is carried out with the used tire in the inflated state. At this time, radial growth of the tire in the left and right shoulder regions increases, in particular, in used tires having low aspect ratio. Therefore, the end portions of belt plies in the shoulder regions can easily be exposed on the surface of the base tires due to the buffing process. Such base tires cannot be used as retread tires, so it is necessary to take some measure to increase the yield of base tires.

Also, base tires are obtained from used tires, so sometimes belt-edge-separation (separation of the peripheral rubber in the belt layer end portions) occurs within base tires. Such base tires cannot be used as retread tires, so it is necessary to take some measure to suppress belt-edge-separation at the new tire stage. Note that belt-edge-separation within a base tire cannot be detected by external visual examination of the tire, so it is necessary to detect whether or not it has occurred using special inspection instruments.

Therefore, in the pneumatic tire 1, the following configuration is adopted in order to increase the yield of base tires while maintaining the belt-edge-separation resistance performance (see FIGS. 1 to 3).

First, a wear end surface WE of the circumferential main groove 2 is drawn as illustrated in FIG. 2 when viewed as a cross-section from the tire meridian direction. The wear end surface WE refers to the surface estimated from a wear indicator present in the tire. Additionally, the wear end surface WE is measured under the condition of a single tire with the tire in a non-inflated state. In a typical pneumatic tire, the wear end surface WE is on a curve that is roughly parallel with the tread profile.

At this time, a distance Dcc on the tire equatorial plane CL from the circumferential reinforcing layer 145 to the wear end surface WE and a distance De from the end portion of the circumferential reinforcing layer 145 to the wear end surface WE preferably have a relationship such that $1.06 \leq De/Dcc$, and more preferably have a relationship such that $1.08 \leq De/Dcc$. There is no particular limitation on the upper limit of the ratio De/Dcc, but if the ratio De/Dcc is excessively large, the heat generation in the tread rubber when the tire is rolling increases which reduces the tire durability, and this is not desirable. Therefore, preferably, the lower limit of the ratio De/Dcc is in the range of, for example, $De/Dcc \leq 1.38$.

The distance Dcc and distance De are measured under the condition of a single tire with the tire in a non-inflated state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined using the belt cord on the outermost side in the tire width direction among the belt cords that constitute the circumferential reinforcing layer 145.

Herein, "specified rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Specified internal pressure" refers to "maximum air pressure" stipulated by JATMA, a maximum value in "tire load limits at various cold inflation pressures" defined by TRA, and "inflation pressures" stipulated by ETRTO. Note that "specified load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the specified internal pressure is an air pressure of 180 kPa, and the specified load is 88% of the maximum load capacity.

Also, a distance Gcc from the tread profile to the tire inner circumferential surface at the tire equatorial plane CL and a distance Gsh from the tread edge P to the tire inner circumferential surface preferably have a relationship such that $1.10 \leq Gsh/Gcc$, and more preferably a relationship such that $1.20 \leq Gsh/Gcc$.

Figure 13:
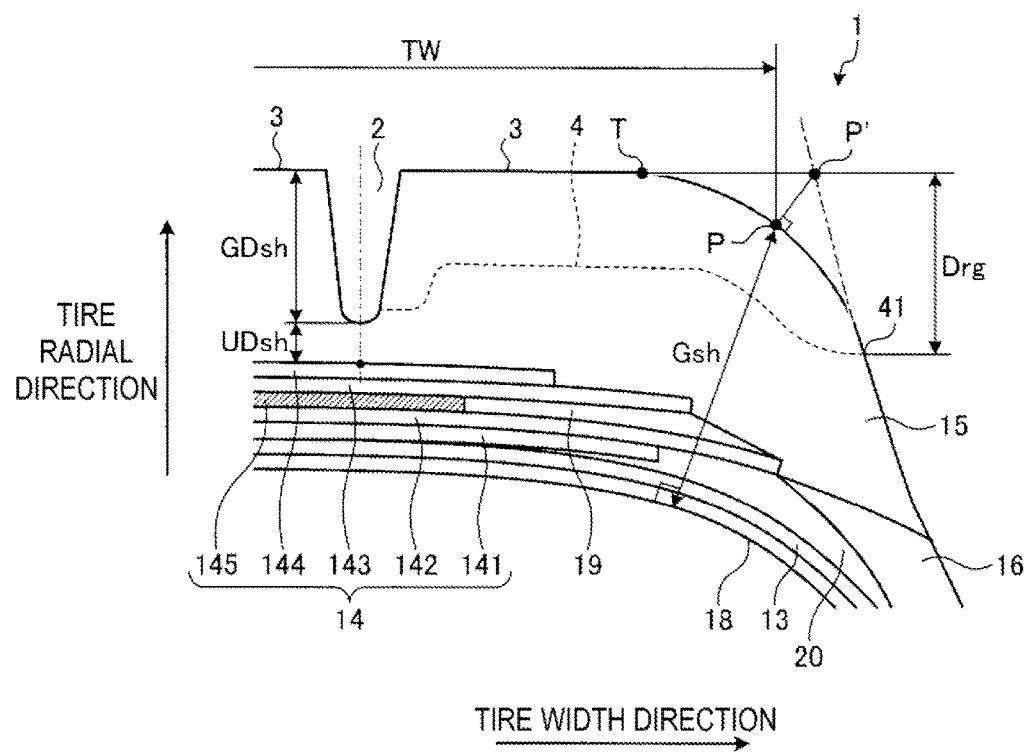
FIG. 13 is an explanatory view illustrating a modified example of the pneumatic tire depicted in FIG. 1.

There is no particular limitation on the upper limit of the ratio Gsh/Gcc. However, when the tire is mounted on a specified rim, inflated to the specified internal pressure, and is in an unloaded state, preferably the upper limit of the ratio Gsh/Gcc is prescribed so that the radius at the tread edge P of the tread profile is less than or equal to the radius at the tire equatorial plane CL. In other words, preferably, the upper limit of the ratio Gsh/Gcc is prescribed so that the tread profile has an arc shape having a center on the inner side in the tire radial direction or a linear shape, and does not have an inverse-R shape (an arc shape having a center on the outer side in the tire radial direction). For example, in a configuration having a square shaped shoulder portion as in FIG. 2, the upper limit of the ratio Gsh/Gcc is approximately from 1.4 to 1.5. Meanwhile, in the configuration having shoulder portions with a round shape as illustrated in FIG. 13 and as described later, the upper limit of the ratio Gsh/Gcc is about 1.3 to 1.4.

The distance Gcc is measured as the distance from the intersection between the tire equatorial plane CL and the tread profile to the intersection between the tire equatorial plane CL and the tire inner circumferential surface when viewed as a cross-section from the tire meridian direction. Therefore, in a configuration having a circumferential main groove 2 at the tire equatorial plane CL such as the configuration illustrated in FIG. 1 and FIG. 2, the distance Gcc is measured omitting the circumferential main groove 2. The distance Gsh is measured as the length of a perpendicular line from the tread edge P to the tire inner circumferential surface when viewed as a cross-section from the tire meridian direction.

In the configuration illustrated in FIG. 2, the pneumatic tire 1 includes an innerliner 18 on the inner circumferential surface of the carcass layer 13, and the innerliner 18 is disposed across the entire region of the tire inner circumferential surface. In such a configuration, the distance Gcc and the distance Gsh are measured on the basis of the outer surface of the innerliner 18 (tire inner circumferential surface). The tread edge P refers to a point of the tread edge portion in a configuration having a (1) square shaped shoulder portion. For example, in the configuration illustrated in FIG. 2, the tread edge P and a tire ground contact edge T are in accord with each other due to the shoulder portion having a square shape. Conversely, (2) in a configuration having the round shaped shoulder portion, as illustrated in the modified example of FIG. 13 described below, taking an intersection P' between the tread portion profile and the side wall portion profile when viewed as a cross-section from the tire meridian direction, the tread edge P is taken as the bottom of a perpendicular line drawn from the intersection P' to the shoulder portion.

Additionally, the "tire ground contact edge T" refers to the maximum width position in a tire axial direction of a contact surface between the tire and a flat plate in a configuration in which the tire is mounted on a specified rim, inflated to the specified internal pressure, placed perpendicularly to the flat plate in a static state, and loaded with a load corresponding to the specified load.

Figure 4A:
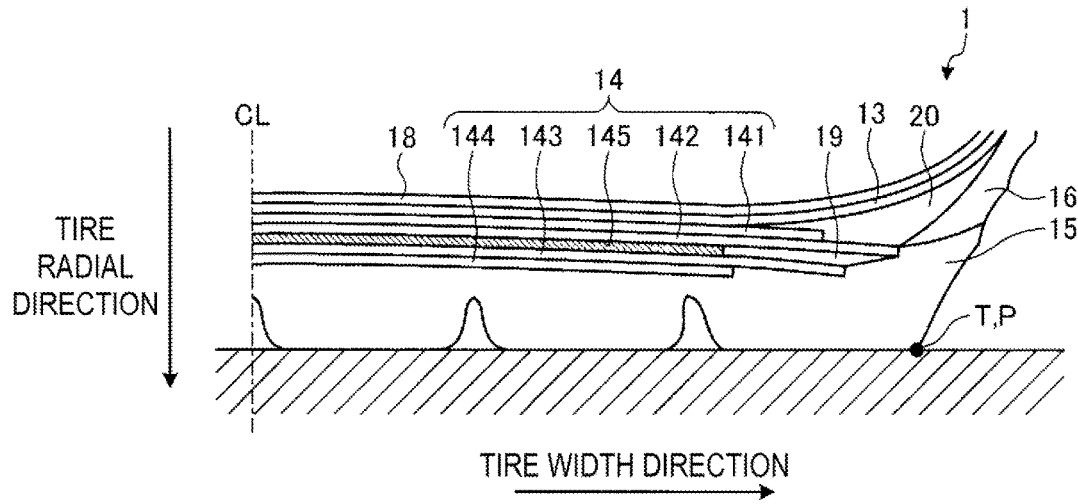
FIGS. 4A and 4B are explanatory views illustrating the effect of the pneumatic tire depicted in FIG. 1.
Figure 4B:
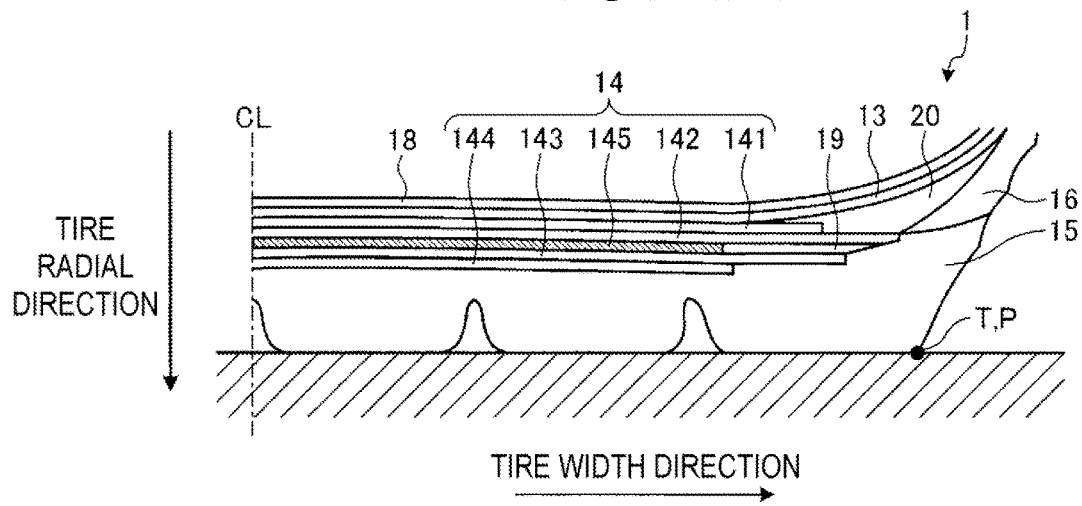

FIGS. 4A and 4B are explanatory views illustrating the effect of the pneumatic tire depicted in FIG. 1. FIGS. 4A and 4B illustrate the ground contact conditions of tires having different ratios De/Dcc and Gsh/Gcc.

In the tire of the Comparative Example of FIG. 4A with the configurations illustrated in FIGS. 1 to 3, the ratio De/Dcc is set so that the values are equal (De/Dcc=1.00), and, the ratio Gsh/Gcc is set smaller (Gsh/Gcc=1.06). In this configuration, when the tire does not contact the ground, the tread profile has a shoulder drop shape in which the outer diameter reduces from the tire equatorial plane CL toward the tread edge P (not illustrated). Therefore, when the tire makes ground contact as illustrated in FIG. 4A, the tread portion shoulder region deforms greatly toward the road surface (the outer side in the tire radial direction). At this time, the distances Dcc and De from the circumferential reinforcing layer 145 to the wear end surface WE are the same (De/Dcc=1.00), so the end portion of the circumferential reinforcing layer 145 bends greatly toward the road surface side (the outer side in the tire radial direction) following the deformation of the tread portion shoulder region. Therefore, the strain of the circumferential reinforcing layer 145 is large when the tire makes ground contact.

In contrast, in the tire of the Working Example of FIG. 4B, the ratio De/Dcc is set larger than that of the configurations of FIGS. 1 to 3 (De/Dcc=1.08), and, the ratio Gsh/Gcc is set larger (Gsh/Gcc=1.20) in the configuration of FIG. 1 to FIG. 3. In this configuration, when the tire does not contact the ground, the difference in diameter between the outer diameter at the tire equatorial plane CL and the outer diameter at the tread edge P of the tread profile is small, and the tread profile overall has a flat shape (approximately parallel to the tire rotational axis) (see FIGS. 1 and 2). Therefore, as illustrated in FIG. 4B, the amount of deformation of the tread portion shoulder region when the tire makes ground contact is small. In addition, the distances Dcc, De from the circumferential reinforcing layer 145 to the wear end surface WE have a relationship such that De≤Dcc, so compared with a configuration in which the values of the ratio De/Dcc are substantially equal, the ground contact patch pressure of the shoulder land portions when the tire makes ground contact is increased.

When the pneumatic tire 1 is reused as a retread tire, a portion of the tread rubber of the used tire is removed by a buffing process as described above, to obtain a base tire. In this buffing process, the amount of buffing (the amount of tread rubber removed by the buffing) is specified so that (1) the groove bottom line of each of the circumferential main grooves 2 does not remain on the surface of the base tire, (2) the belt plies are not exposed on the surface of the base tire, and, (3) shoulder wear of the used tire (in particular, step wear) does not remain on the surface of the base tire. Specifically, the amount of buffing is specified using the groove depth GDcc of the circumferential main groove 2 near the tire equatorial plane CL, the groove depth GDsh of the outermost circumferential main grooves 2, and a position of an opening end portion 41 of the lug groove 4 of the shoulder land portion 3 as criteria.

At this time, in the configuration of FIG. 4B, the amount of deformation of the tread portion shoulder region is small when the tire makes ground contact as described above, so the rigidity of the tread portion shoulder region is ensured, and the radial growth of the tire is suppressed. Also, the ground contact pressure of the shoulder land portion when the tire makes ground contact is increased, so the radial growth of the tire in the region to the outer side in the tire width direction of the circumferential reinforcing layer 145 is suppressed. As a result, deformation of the belt layer 14 is suppressed, and exposure of the belt layer 14 when buffing the used tire is suppressed.

Also, as described above, the shoulder portion with the ratio Gsh/Gcc set large has a thick walled structure, so it is possible to prevent exposure of the belt plies while properly ensuring the amount of buffing. In this way, the yield of these tires is improved.

[Under-Groove Gauge]

Figure 5:
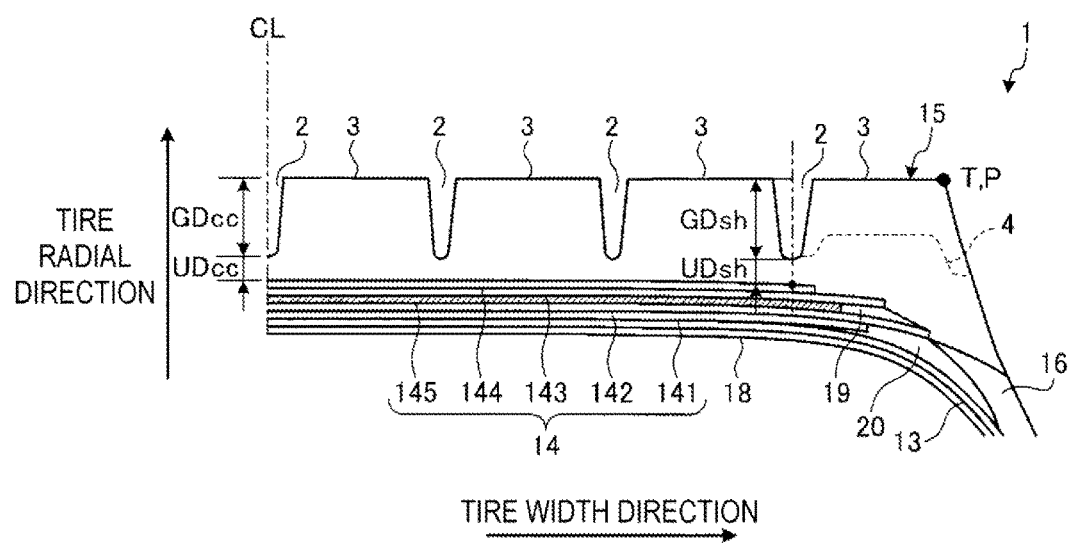
FIG. 5 is an explanatory view illustrating the effect of the pneumatic tire depicted in FIG. 1.

FIG. 5 is an explanatory view illustrating the pneumatic tire depicted in FIG. 1. This drawing is a reproduction of FIG. 2, with the dimensions and symbols necessary for explaining the under-groove gauge added instead of the dimensions and symbols of FIG. 2.

In the pneumatic tire 1, in FIG. 5, preferably, the groove depth GDsh and the under-groove gauge UDsh of the outermost circumferential main grooves 2 have a relationship such that 0.20≤UDsh/GDsh.

Also, in FIG. 5, preferably, the groove depth GDcc and the under-groove gauge UDcc of the circumferential main groove 2 nearest the tire equatorial plane CL have a relationship such that 0.15≤UDcc/GDcc, and more preferably have a relationship such that 0.20≤UDcc/GDcc.

The groove depths GDsh, GDcc of the circumferential main grooves 2 are measured as the distance from the tread profile to the groove bottom (deepest position) of the circumferential main groove 2. Also, the groove depths GDsh, GDcc are measured excluding raised bottom portions such as stone ejectors or the like formed in the groove bottom. Also, the groove depths GDsh, GDcc depend on the tire size, but are normally set within the ranges of 10 mm≤GDsh≤25 mm and 10 mm≤GDcc≤25 mm.

The under-groove gauges UDsh, UDcc of the circumferential main grooves 2 are measured as the distance from the groove bottom of the circumferential main groove 2 to the belt layer 14 (or in more detail, the circular arc connecting the tops on the outer side in the tire radial direction of the belt cords of the belt ply on the outermost side in the tire radial direction).

The circumferential main groove 2 closest to the tire equatorial plane CL in the case in which there is a circumferential main groove 2 on the tire equatorial plane CL is that circumferential main groove (see FIG. 5), and in the case in which there is a land portion 3 on the tire equatorial plane CL (there is no circumferential main groove 2) (not illustrated), the circumferential main groove 2 closest to the tire equatorial plane CL is the circumferential main groove 2 located in the position closest to the tire equatorial plane CL out of the plurality of circumferential main grooves 2.

Note that there is no particular limitation on the upper limit of the ratio UDsh/GDsh and the ratio UDcc/GDcc, but if the under-groove gauges UDsh, UDcc are excessively large, the tread gauge increases and the tire rolling resistance is reduced, which is not desirable. Therefore, preferably, the upper limit of the ratio UDsh/GDsh and the ratio UDcc/GDcc is set as appropriate taking this point into consideration. Specifically, preferably, the ratio UDsh/GDsh and the ratio UDcc/GDcc are within the ranges of UDsh/GDsh≤0.7 and UDcc/GDcc≤0.7.

Also, preferably, the ratio UDsh/GDsh and the ratio UDcc/GDcc have a relationship such that UDcc/GDcc <UDsh/GDsh. Therefore, the under-groove gauge ratio UDsh/GSsh of the outermost circumferential main grooves 2 is set larger than the under-groove gauge ratio UDcc/GDcc of the circumferential main groove 2 near the tire equatorial plane CL. In this way, it is possible to realize a tread shape having the ratio GDsh/GDcc as described above, while making the groove depths GDsh, GDcc of each of the circumferential main grooves 2 appropriate.

Also, preferably, the groove depth GDsh of the outermost circumferential main grooves 2 and the groove depth GDcc of the circumferential main groove 2 near the tire equatorial plane CL have a relationship such that 1.0≤GDsh/GDcc≤1.2. In this way, the ratio GDsh/GDcc of the groove depths is made appropriate.

Note that in the configuration in which the circumferential main grooves 2 are provided between the circumferential main groove 2 nearest the tire equatorial plane CL and the outermost circumferential main grooves 2 (see FIGS. 1 and 5), normally, the groove depths and the under-groove gauges of these circumferential main grooves 2 are set as appropriate with the groove depths GDsh, GDcc and the under-groove gauges UDsh, UDcc as described above as references.

In the above configuration, the under-groove gauges UDsh, UDcc of the circumferential main grooves 2 are appropriately ensured, so it is possible to ensure a sufficient amount of buffing so that shoulder wear of the used tire does not remain on the surface of the base tire. In this way, the yield of these tires is improved.

[Lug Grooves as Marks for Determining the Time for Retreading]

As described above, in tires having a circumferential reinforcing layer in a belt layer, shoulder wear tends to easily occur. If shoulder wear progresses greatly, it is not possible to remove the shoulder wear by the buffing process, and the used tire cannot be retreaded. This is because if a large amount of the shoulder wear is removed by buffing, the end portion of the belt layer is exposed on the surface of the base tire.

Meanwhile, frequently, it is determined after the buffing process whether or not it is possible to retread the used tire, in other words, whether or not the end portion of the belt layer is exposed on the surface of the base tire. In this case, the buffing process may be wasteful, which is detrimental for the user (mainly, the tire dealer that carries out the buffing), so this is not desirable.

Therefore, the pneumatic tire 1 has the following configuration in order that the user can appropriately determine the time for retreading the tire.

FIGS. 6 to 9 are enlarged cross-sectional views illustrating a shoulder portion of the pneumatic tire depicted in FIG. 1. Each of these drawings illustrates the pneumatic tire 1 having the same structure, and, illustrates the shoulder portion when the tire is mounted on a specified rim, inflated to the specified internal pressure, and is in an unloaded state.

Figure 6:
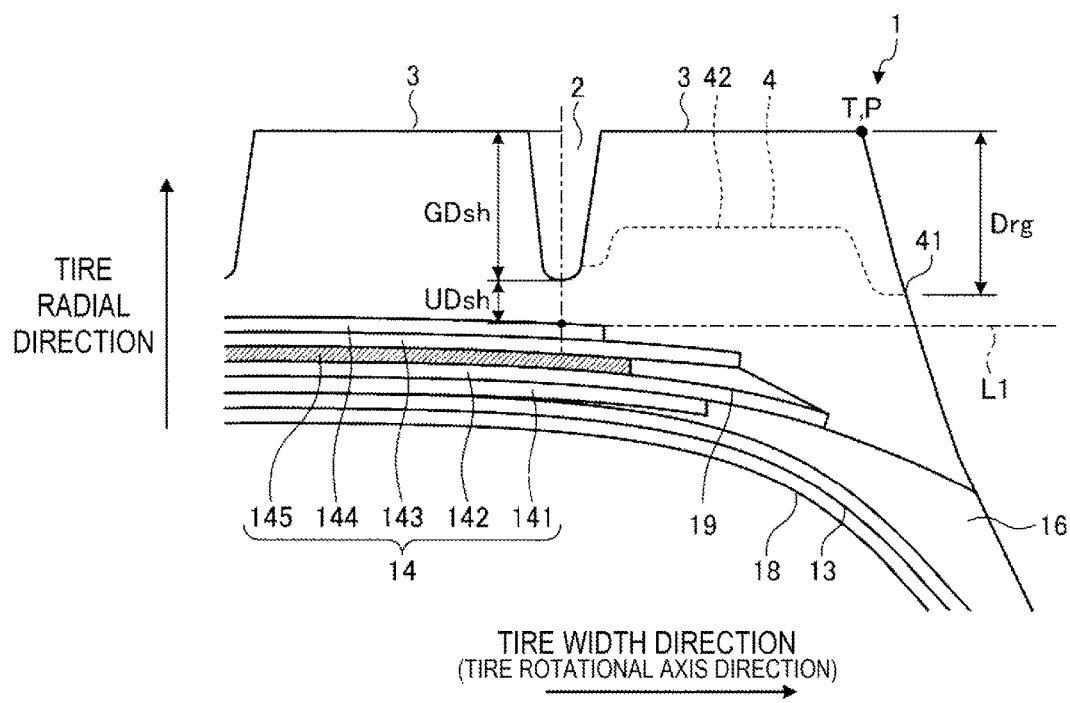
FIG. 6 is an enlarged cross-sectional view illustrating a shoulder portion of the pneumatic tire depicted in FIG. 1.

First, as illustrated in FIG. 6, a straight line L1 is drawn parallel to the tire rotational axis from the end portion on the outer side in the tire width direction and on the outermost side in the tire radial direction of the outermost circumferential main groove 2 out of the plurality of belt plies 141 to 145 constituting the belt layer 14.

At this time, in the pneumatic tire 1, the opening end portion 41 of the lug groove 4 is disposed on the outer side in the tire radial direction of the straight line L1. Specifically, preferably, the opening end portion 41 of the lug groove 4 is disposed at a distance not less than 2 mm from the straight line L1. Also, the opening end portion 41 of the lug groove 4 is used as a mark for determining the time for retreading the tire.

In this configuration, as wear progresses, shoulder wear occurs at the edge portion on the outer side in the tire width direction of the shoulder land portions 3. Also, before this shoulder wear reaches the opening end portion 41 of the lug groove 4, it is determined that the used tire can be retreaded, but if the shoulder wear progresses past the opening end portion 41 of the lug groove 4, it is determined that the tire cannot be retreaded. In other words, it is determined whether or not the tire can be retreaded using as the criterion whether or not the opening end portion 41 of the lug groove 4 has been eliminated by the shoulder wear. Also, when the shoulder wear has reached the opening end portion 41 of the lug groove 4, it is the recommended timing for retreading. In this state, the position of the opening end portion 41 of the lug groove 4 is made appropriate as described above, so it is possible to remove the shoulder wear portion by the buffing process while preventing exposure of the belt layer on the surface of the base tire. In this way, the opening end portion 41 of the lug groove 4 functions as a mark for determining the time for retreading the tire.

Figure 7:
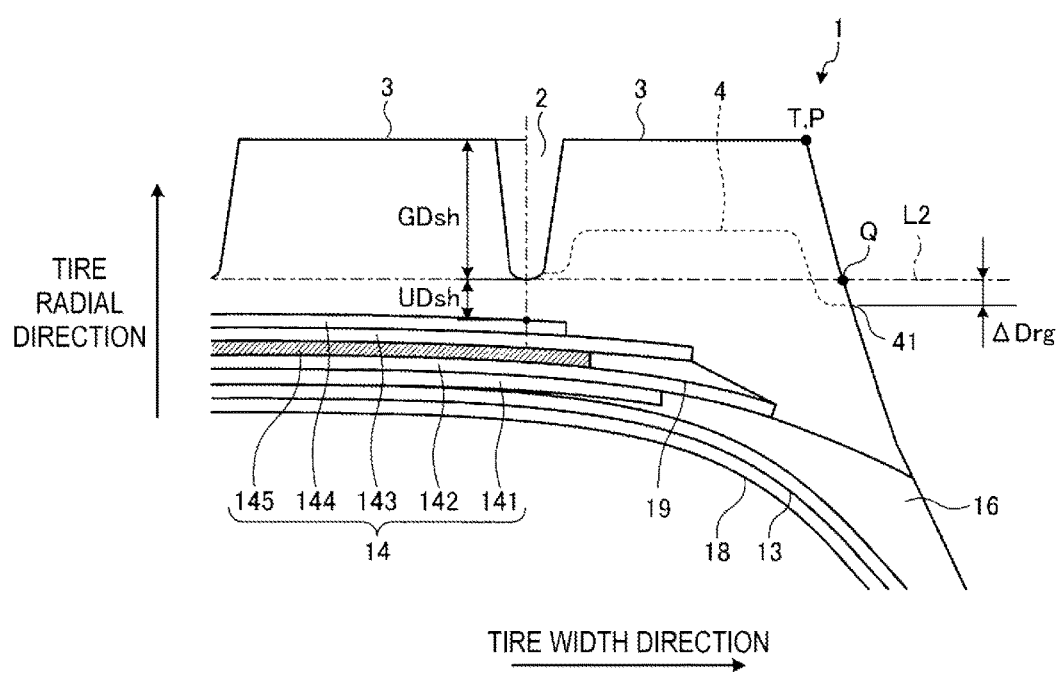
FIG. 7 is an enlarged cross-sectional view illustrating the shoulder portion of the pneumatic tire depicted in FIG. 1.

Also, when viewed as a cross-section from the tire meridian direction, a curved line L2 is drawn parallel to the tread profile passing through the groove bottom of the outermost circumferential main groove 2, as illustrated in FIG. 7. Also, an intersection Q is taken between the curved line L2 and the buttress portion.

At this time, all the belt plies 141 to 145 constituting the belt layer 14 are on the inner side in the tire radial direction of the curved line L2. In particular, the end portions of all the belt plies 141 to 145 on the outer side in the tire width direction of the outermost circumferential main groove 2 are on the inner side in the tire radial direction of the curved line L2. In this way, it is possible to prevent exposure of the belt layer on the surface of the base tire during the buffing process.

Also, the under-groove gauge UDsh of the outermost circumferential main groove 2 and the distance ΔDrg in the tire radial direction from the intersection Q to the opening end portion 41 of the lug groove 4 have a relationship such that $-1.0 \leq \Delta Drg/UDsh \leq 1.0$, where the outer side in the tire radial direction is positive. Also, preferably, the ratio ΔDrg/UDsh is set to have a relationship such that $-1.0 \leq \Delta Drg/UDsh \leq 0$, and more preferably is set to have a relationship such that $-0.5 \leq \Delta Drg/UDsh \leq -0.1$. In this way, it is possible to delay the time for retreading the tire and extend the primary life of the tire by disposing the opening end portion 41 of the lug groove 4 on the inner side in the tire radial direction of the intersection Q. Also, it is possible to accurately determine whether or not the tire can be retreaded by having the ratio ΔDrg/UDsh in the range of $-1.0 \leq \Delta Drg/UDsh$ (and further, $-0.5 \leq \Delta Drg/UDsh$).

Figure 8:
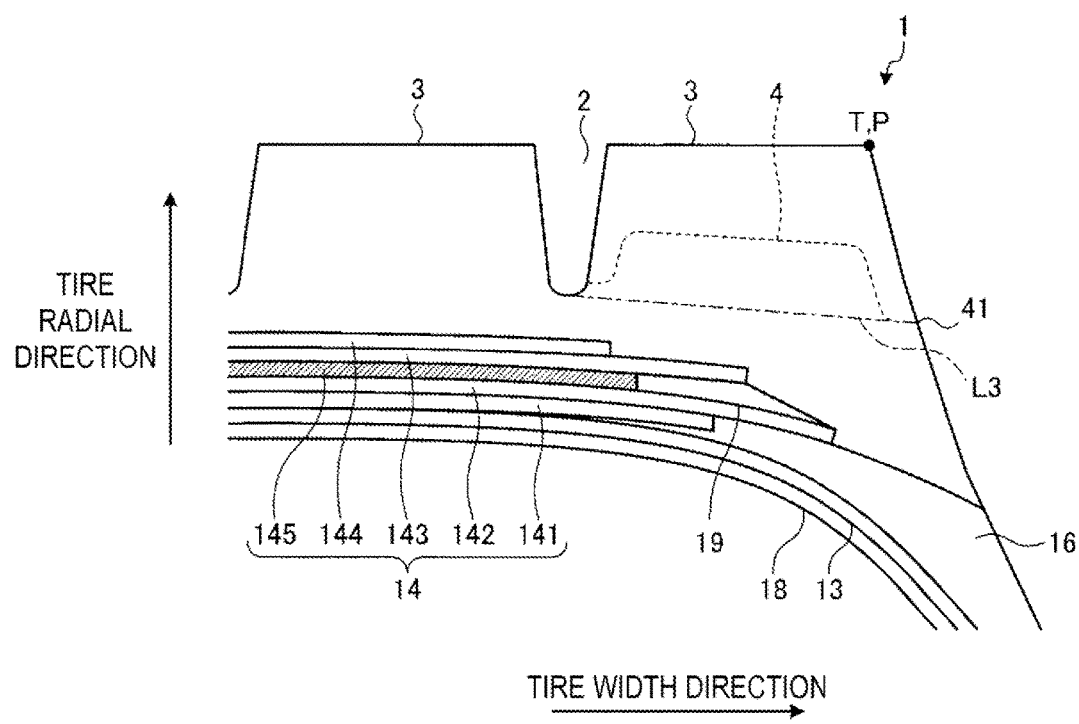
FIG. 8 is an enlarged cross-sectional view illustrating the shoulder portion of the pneumatic tire depicted in FIG. 1.

Also, when viewed as a cross-section from the tire meridian direction, a straight line L3 is drawn connecting the groove bottom of the outermost circumferential main groove 2 and the opening end portion 41 of the lug groove 4, as illustrated in FIG. 8.

At this time, all the belt plies 141 to 145 constituting the belt layer 14 are on the inner side in the tire radial direction of the straight line L3. In this way, it is possible to prevent exposure of the belt layer on the surface of the base tire during the buffing process.

Figure 9:
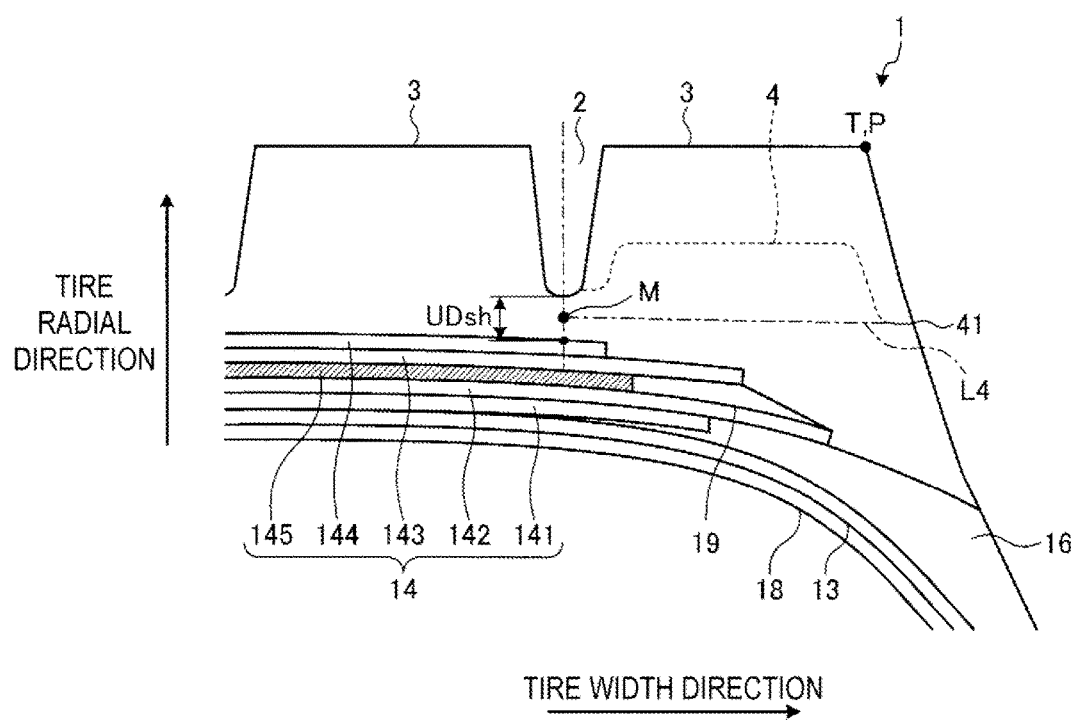
FIG. 9 is an enlarged cross-sectional view illustrating the shoulder portion of the pneumatic tire depicted in FIG. 1.

Also, when viewed as a cross-section from the tire meridian direction, a straight line L4 is drawn connecting the midpoint M of the under-groove gauge UDsh of the outermost circumferential main groove 2 and the opening end portion 41 of the lug groove 4, as illustrated in FIG. 9. The midpoint M of the under-groove gauge UDsh is the midpoint of the two points that define the under-groove gauge UDsh.

At this time, all the belt plies 141 to 145 constituting the belt layer 14 are on the inner side in the tire radial direction of the straight line L4. In this way, it is possible to prevent exposure of the belt layer on the surface of the base tire during the buffing process.

Also, in FIG. 6, the groove depth GDsh and the under-groove gauge UDsh of the outermost circumferential groove 2 and the distance Drg in the tire radial direction from the tire ground contact edge T to the opening end portion 41 of the lug groove 4 have a relationship such that $0.7 \leq Drg/(GDsh+UDsh) \leq 1.1$. In this way, it is possible to accurately determine whether or not the tire can be retreaded.

Figure 10:
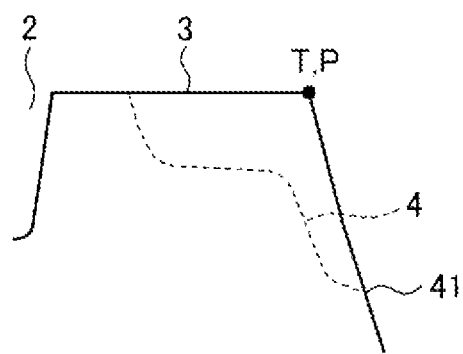
FIG. 10 is an explanatory view illustrating a modified example of the pneumatic tire depicted in FIG. 1.
Figure 11:
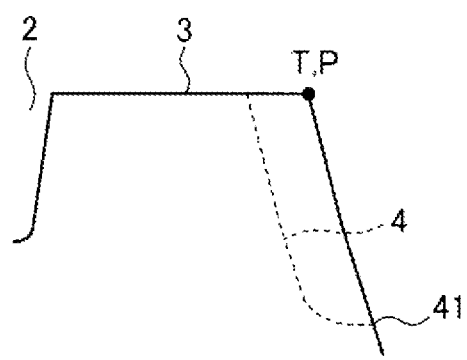
FIG. 11 is an explanatory view illustrating a modified example of the pneumatic tire depicted in FIG. 1.
Figure 12:
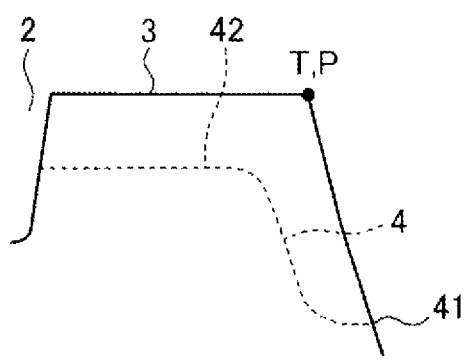
FIG. 12 is an explanatory view illustrating a modified example of the pneumatic tire depicted in FIG. 1.

FIGS. 10 to 12 are explanatory views illustrating modified examples of the pneumatic tire depicted in FIG. 1. These drawings illustrate modified examples of the lug groove 4 of the shoulder land portion 3.

In the configuration of FIG. 6, the lug groove 4 extends in the tire width direction and passes through the shoulder land portion 3, and opens to both the outermost circumferential main groove 2 and the buttress portion. Also, there is a raised bottom portion 42 within the shoulder land portion 3.

However, these are not limitations, and the lug groove 4 may open to at least the buttress portion. The opening end portion 41 of the lug groove 4 functions as a mark for determining the time for retreading the tire.

For example, as illustrated in FIG. 10, the lug groove 4 may open at one end portion thereof to the buttress portion, and terminate within the shoulder land portion at the other end portion thereof. Also, as illustrated in FIG. 11, the lug groove 4 may be formed only in the buttress portion, extending from the tire ground contact edge T along the buttress portion on the inner side in the tire radial direction. Also, as illustrated in FIG. 12, the lug groove 4 may open to the outermost circumferential groove 2 with the bottom thereof raised by the raised bottom portion 42 as it is.

[Round Shaped Shoulder Portion]

FIG. 13 is an explanatory view of a modified example of the pneumatic tire depicted in FIG. 1. FIG. 13 illustrates a configuration having a shoulder portion with a round shape.

In the configuration in FIG. 1, the shoulder portion has a square shape, in which the tire ground contact edge T and tread edge P are in accord, as illustrated in FIG. 2.

However, the shoulder portion is not limited as such, and may also have a round shape, as illustrated in FIG. 13. In such a case, an intersection P' is taken from the tread portion profile and the side wall portion profile when viewed as a cross-section from the tire meridian direction, and the tread edge P is taken as the bottom of a perpendicular line drawn from the intersection P' to the shoulder portion. Therefore, the tire ground contact edge T and the tread edge P normally are in mutually different locations. Additional Data Additionally in the pneumatic tire 1, in FIG. 1, the tread width TW and the width Ws of the circumferential reinforcing layer 145 preferably have a relationship such that $0.70 \leq Ws/TW \leq 0.90$.

The tread width TW is the distance in the direction of the tire rotational axis between the left and right tread ends P, P, measured when the tire is mounted on a specified rim, inflated to a specified internal pressure, and is in an unloaded state.

The width Ws of the circumferential reinforcing layer 145 is the distance from the left to the right end portions of the circumferential reinforcing layer 145 in the tire rotational axis direction measured when the tire is mounted on a specified rim, inflated to a specified internal pressure, and is in an unloaded state. Also, the width Ws of the circumferential reinforcing layer 145 is the distance between the outermost end portions of the divided portions when the circumferential reinforcing layer 145 has a structure that is divided in the tire width direction (not illustrated).

Moreover, a typical pneumatic tire has a left-right symmetrical structure centered on the tire equatorial plane CL, as illustrated in FIG. 1. As a result, the distance from the tire equatorial plane CL to the tread edge P is TW/2, and the distance from the tire equatorial plane CL to the circumferential reinforcing layer 145 is Ws/2.

In contrast, in a pneumatic tire having a left-right asymmetrical structure (not illustrated), the range of the ratio Ws/TW between the width Ws of the circumferential reinforcing layer 145 and the tread width TW is stipulated by conversion to half width based on the tire equatorial plane CL. Specifically, the distance TW' (not illustrated) from the tire equatorial plane CL to the tread edge P and the distance Ws' (not illustrated) from the tire equatorial plane CL to the end portion of the circumferential reinforcing layer 145 are set satisfying the relationship 0.70≤Ws'/TW'≤0.90.

Also, as illustrated in FIG. 1, preferably, a tread width TW and a total tire width SW have a relationship such that 0.79≤TW/SW≤0.89.

The total tire width SW refers to a linear distance (including all portions such as letters and patterns on the tire surface) between the side walls when the tire is mounted on a specified rim, inflated to the specified internal pressure, and is in an unloaded state.

Also, as illustrated in FIG. 2, preferably, a distance Hcc from the circumferential reinforcing layer 145 to the tread profile on the tire equatorial plane CL and a distance He from the end portion of the circumferential reinforcing layer 145 to the tread profile have a relationship such that He/Hcc≤0.97. There is no particular limitation on the lower limit of the ratio He/Hcc, but it is restricted by its relationship to the ability to retread. For example, preferably, the lower limit of the ratio He/Hcc is in the range of 0.90≤He/Hcc.

The distance Hcc and the distance He are measured with the tire mounted on a specified rim, inflated to the specified internal pressure, and is in an unloaded state. Additionally, the measurement point on the circumferential reinforcing layer 145 side is defined by a curve connecting the center points of the belt cords that constitute the circumferential reinforcing layer 145, when viewed as a cross-section from the tire meridian direction. Moreover, the end portion of the circumferential reinforcing layer 145 is defined using the belt cord on the outermost side in the tire width direction among the belt cords that constitute the circumferential reinforcing layer 145.

Also, preferably, a width Wb2 of the wider cross belt 142 and a cross-sectional width Wca of the carcass layer 13 have a relationship such that 0.74≤Wb2/Wca≤0.89, and more preferably within the range of 0.78≤Wb2/Wca≤0.83.

Preferably, the width Ws of the circumferential reinforcing layer 145 and the cross-sectional width Wca of the carcass layer 13 have a relationship such that 0.60≤Ws/Wca≤0.70.

Additionally, the tread width TW and the cross-sectional width Wca of the carcass layer 13 preferably have a relationship such that 0.82≤TW/Wca≤0.92.

The cross-sectional width Wca of the carcass layer 13 refers to a linear distance between the left and right maximum width positions of the carcass layer 13 when the tire is mounted on a specified rim, inflated to the specified internal pressure, and is in an unloaded state.

Also, in FIG. 3, preferably, a width Wb3 of the narrower cross belt 143 and the width Ws of the circumferential reinforcing layer 145 have a relationship such that 0.75≤Ws/Wb3≤0.90. As a result, the width Ws of the circumferential direction reinforcing layer 145 can be properly secured.

Also, as illustrated in FIG. 3, the circumferential reinforcing layer 145 is preferably disposed inward in the tire width direction from the left and right edge portions of the narrower cross belt 143 of the pair of cross belts 142, 143. Additionally, the width Wb3 of the narrower cross belt 143 and the distance S from the edge portion of the circumferential direction reinforcing layer 145 to the edge portion of the narrower cross belt 143 is preferably in a range of 0.03≤S/Wb3≤0.12. As a result, the distance between the end portions of the width Wb3 of the cross belt 143 and the end portions of the circumferential reinforcing layer 145 are properly secured. This point is the same even if the circumferential reinforcing layer 145 has a divided structure (not illustrated).

The distance S of the circumferential reinforcing layer 145 is measured as a distance in the tire width direction when the tire is mounted on a specified rim, inflated to the specified internal pressure, and is in an unloaded state.

Furthermore, in the configuration in FIG. 1, the circumferential reinforcing layer 145 is constituted by a single steel wire wound in a spiral manner, as illustrated in FIG. 3. However, the configuration is not limited thereto, and the circumferential reinforcing layer 145 may also be configured by a plurality of wires wound spirally around side-by-side to each other (multiple winding structure). In this case, preferably, the number of wires is 5 or less. Additionally, the width of winding per unit when five wires are wound in a multiple winding manner is preferably not more than 12 mm. As a result, a plurality of wires (not less than 2 and not more than 5 wires) can be wound properly at an inclination within a range of ±5° with respect to the tire circumferential direction.

Furthermore, in the pneumatic tire 1, the width Wb1 of the large angle belt 141 and the width Wb3 of the narrower cross belt 143 of the pair of cross belts 142, 143 preferably have a relationship satisfying 0.85≤Wb1/Wb3≤1.05 (see FIG. 3). As a result, the ratio Wb1/Wb3 is made appropriate.

The width Wb1 of the large angle belt 141 and the width Wb3 of the cross belt 143 are measured as the distance in the tire width direction when the tire is mounted on a specified rim, inflated to a specified internal pressure, and is in an unloaded state.

In the configuration of FIG. 1, the belt layer 14 has a structure with left-right symmetry centered on the tire equatorial plane CL as illustrated in FIG. 3, and the width Wbl of the large angle belt 141 and the width Wb3 of the narrower cross belt 143 have a relationship satisfying Wb1≤Wb3. As a result, an edge portion of the large angle belt 141 is disposed on an inner side in the tire width direction than the edge portion of the narrower cross belt 143 in a region on either side of the tire equatorial plane CL. However, the configuration is not limited thereto, and the width Wb1 of the large angle belt 141 and the width Wb3 of the narrower cross belt 143 may have a relationship such that Wb1≥Wb3 (not illustrated).

Also, preferably, the belt cords of the large angle belt 141 are steel wires, and the number of ends in the large angle belt is not less than 15 ends/50 mm and not more than 25 ends/50 mm. Moreover, the belt cords of the pair of cross belts 142, 143 are constituted by steel wire, and the number of ends in the pair of cross belts 142, 143 preferably is not less than 18 ends/50 mm and not more than 28 ends/50 mm, and more preferably is not less than 20 ends/50 mm and not more than 25 ends/50 mm. Also, the belt cords that constitute the circumferential reinforcing layer 145 are steel wire, and the number of ends in the circumferential reinforcing layer 145 preferably is not less than 17 ends/50 mm and not more than 30 ends/50 mm. As a result, the strengths of the belt plies 141, 142, 143, 145 are properly secured.

Also, preferably, a modulus E1 at 100% elongation of the coating rubber of the large angle belt 141 and a modulus Es at 100% elongation of the coating rubber of the circumferential reinforcing layer 145 have a relationship such that 0.90≤Es/E1≤1.10. Moreover, moduli E2, E3 at 100% elongation of the coating rubbers of the pair of cross belts 142, 143, and the modulus Es at 100% elongation of the coating rubber of the circumferential reinforcing layer 145 preferably have a relationship satisfying 0.90≤Es/E2≤1.10 and $0.90 \leq Es/E3 \leq 1.10$. Moreover, the modulus Es at 100% elongation of the coating rubber of the circumferential reinforcing layer 145 is preferably within the range of 4.5 MPa≤Es≤7.5 MPa. As a result, the moduli of the belt plies 141, 142, 143, 145 are made appropriate.

The modulus at 100% elongation is measured in a tensile test at ambient temperature in conformance with JIS (Japanese Industrial Standard) K6251 (using dumbbell no. 3).

Also, preferably, a breaking elongation λ1 of the coating rubber of the large angle belt 141 is in the range of λ1≥200%. Moreover, breaking elongations λ2, λ3 of the coating rubbers of the pair of cross belts 142, 143 are preferably in the range of λ2≥200% and λ3≥200%. Furthermore, a breaking elongation Xs of the coating rubber of the circumferential reinforcing layer 145 is preferably in the range of λs≥200%. As a result, the durability of the belt plies 141, 142, 143, 145 is properly secured.

Breaking elongation is measured by performing a tensile test conforming to JIS-K7161 on a test sample of the JIS-K7162 specification 1B shape (dumb bell shape with a thickness of 3 mm) using a tensile tester (INSTRON5585H manufactured by Instron Corp.) at a pulling speed of 2 mm/min.

Elongation is preferably not less than 1.0% and not more than 2.5% when the tensile load of the belt cords as components that configure the circumferential reinforcing layer 145 is from 100 N to 300 N, and is preferably not less than 0.5% and not more than 2.0% when the tensile load is from 500 N to 1000 N as a tire (when removed from the tire). The belt cords (high elongation steel wire) have good elongation ratio when a low load is applied compared with normal steel wire, so they can withstand the loads that are applied to the circumferential reinforcing layer 145 during the time from manufacture until the tire is used, so it is possible to suppress damage to the circumferential reinforcing layer 145, which is desirable.

The elongation of the belt cord is measured in accordance with JIS G3510.

Additionally, in the pneumatic tire 1, the breaking elongation of the tread rubber 15 is preferably not less than 350%. As a result, the strength of the tread rubber 15 is assured and the occurrence of tears in the outermost circumferential main groove 2 is suppressed. Furthermore, the maximum breaking elongation of the tread rubber 15 is not specifically limited, but is constrained by the type of rubber compound of the tread rubber 15.

Additionally, in this pneumatic tire 1, the hardness of the tread rubber 15 preferably is equal to or greater than 60. This ensures an appropriate strength of the tread rubber 15. Furthermore, the maximum hardness of the tread rubber 15 is not specifically limited, but is constrained by the type of rubber compound of the tread rubber 15.

Here, "rubber hardness" refers to JIS-A hardness in accordance with JIS-K6263.

Also, in the pneumatic tire 1, preferably, a loss tangent tanδ of the tread rubber 15 is in the range of 0.1≤tanδ. The loss tangent tanδ is measured by using a viscoelastic spectrometer under the conditions of a temperature of 20° C., a shearing strain of 10%, and a frequency of 20 Hz.

Belt Cushion

As illustrated in FIG. 2, the pneumatic tire 1 includes a belt cushion 20. The belt cushion 20 is disposed so as to be interposed between the carcass layer 13 and the end portion of the cross belt 142 on the inner side in the tire radial direction of the pair of cross belts 142, 143. For example, in the configuration in FIG. 2, an end portion of the belt cushion 20 on the outer side in the tire radial direction is inserted between the carcass layer 13 and the end portion of the cross belt 142, and abuts the edge portion of the large angle belt 141. Additionally, the belt cushion 20 extends inward in the tire radial direction along the carcass layer 13 and is disposed so as to be interposed between the carcass layer 13 and a sidewall rubber 16. Moreover, a pair of left and right belt cushions 20 are respectively disposed at the left and right side wall portions of the tire.

Additionally, a modulus Ebc at 100% elongation of the belt cushion 20 satisfies a range of 1.5 MPa≤Ebc≤3.0 MPa. Having the modulus Ebc satisfying such a range, the belt cushion 20 exhibits the stress relief action, thereby suppressing separation of the peripheral rubber at the end portions of the cross belt 142.

Moreover, a breaking elongation Xbc of the belt cushion 20 satisfies a range of λbc≥400%. This ensures an appropriate durability of the belt cushion 20.

[Belt Edge Cushion Two-Color Structure]

Figure 14:
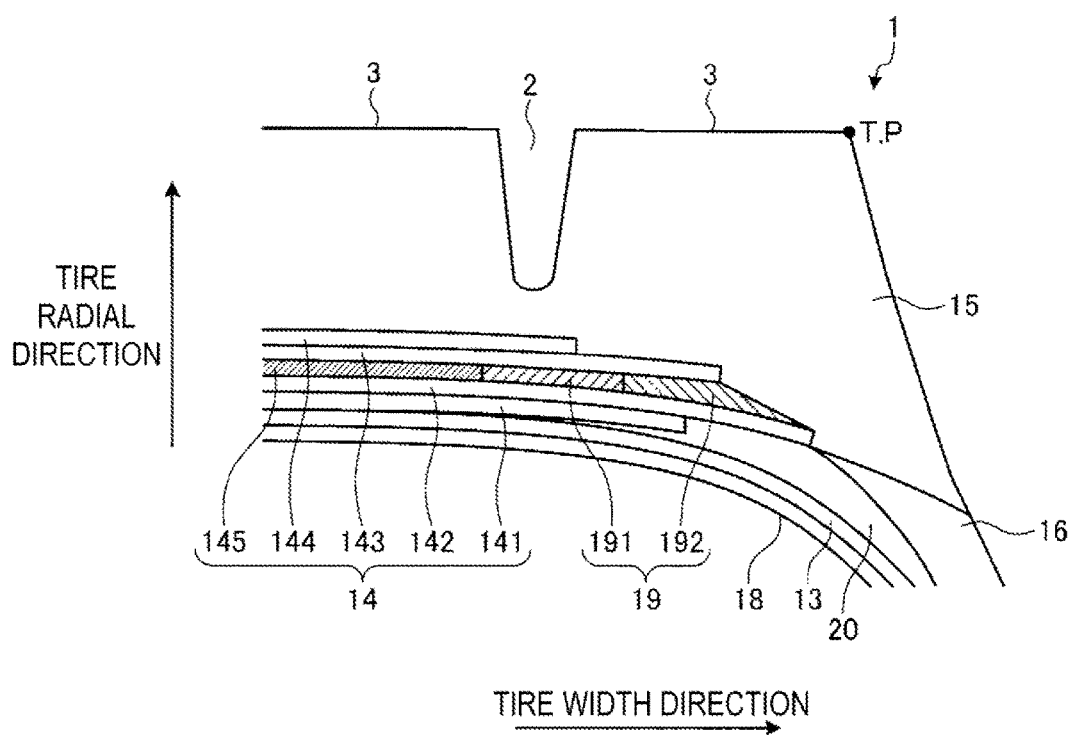
FIG. 14 is an explanatory view illustrating a modified example of the pneumatic tire depicted in FIG. 1.

FIG. 14 is an explanatory view of a modified example of the pneumatic tire depicted in FIG. 1. FIG. 14 is an enlarged view of an end portion of the belt layer 14 on the outer side in the tire width direction. The circumferential reinforcing layer 145 and the belt edge cushion 19 in FIG. 14 are indicated by hatching.

In the configuration illustrated in FIG. 1, the circumferential reinforcing layer 145 is disposed inward in the tire width direction of the left and right edges of the narrower cross belt 143 of the pair of cross belts 142, 143. The belt edge cushion 19 is disposed so as to be sandwiched between the pair of cross belts 142, 143 at a position corresponding to the edge portion of the pair of cross belts 142, 143. Specifically, the belt edge cushion 19 is disposed on the outer side of the circumferential reinforcing layer 145 in the tire width direction so as to be adjacent to the circumferential reinforcing layer 145, and extends from the end portion on the outer side of the circumferential reinforcing layer 145 in the tire width direction to the end portion on the outer side of the pair of cross belts 142, 143 in the tire width direction.

In the configuration illustrated in FIG. 1, the belt edge cushion 19 has a structure that is thicker as a whole than the circumferential reinforcing layer 145 due to the thickness increasing toward the outer side in the tire width direction. The belt edge cushion 19 has a modulus E at 100% elongation that is lower than the coating rubber of the cross belts 142, 143. Specifically, the modulus E at 100% elongation of the belt edge cushion 19 and a modulus Eco of the coating rubber have a relationship such that 0.60≤E/Eco≤0.95. As a result, there is an advantage that the occurrence of separation of rubber materials between the pair of cross belts 142, 143 and in a region on the outer side in the tire width direction of the circumferential reinforcing layer 145 is suppressed.

Conversely, according to the configuration in FIG. 14, the belt edge cushion 19 in the configuration in FIG. 1 has a two-color structure composed of a stress relief rubber 191 and an end portion relief rubber 192. The stress relief rubber 191 is disposed between the pair of cross belts 142, 143 on the outer side of the circumferential reinforcing layer 145 in the tire width direction so as to be adjacent to the circumferential reinforcing layer 145. The end portion relief rubber 192 is disposed between the pair of cross belts 142, 143 on the outer side of the stress relief rubber 191 in the tire width direction at a position corresponding to the edge portion of the pair of cross belts 142, 143 so as to be adjacent to the stress relief rubber 191. Therefore, when viewed as a cross-section from the tire meridian direction, the belt edge cushion 19 has a structure composed by disposing the stress relief rubber 191 and the end portion relief rubber 192 side to side in the tire width direction to fill a region from the end portion of the circumferential reinforcing layer 145 on the outer side in the tire width direction to the edge portion of the pair of cross belts 142, 143.

Additionally, in the configuration of FIG. 14, a modulus Ein at 100% elongation of the stress relief rubber 191 and the modulus Es at 100% elongation of the coating rubber of the circumferential reinforcing layer 145 have a relationship satisfying Ein<Es. Specifically, the modulus Ein of the stress relief rubber 191 and the modulus Es of the circumferential reinforcing layer 145 preferably have a relationship such that $0.6 \leq Ein/Es \leq 0.9$.

Moreover, a modulus Ein at 100% elongation of the stress relief rubber 191 and the modulus Eco at 100% elongation of the coating rubber of the cross belts 142, 143 have a relationship satisfying Ein<Eco in the configuration in FIG. 14. Specifically, the modulus Ein of the stress relief rubber 191 and the modulus Eco of the coating rubber preferably have a relationship such that $0.6 \leq Ein/Eco \leq 0.9$.

Additionally a modulus Eout at 100% elongation of the end portion relief rubber 192 and the modulus Ein at 100% elongation of the stress relief rubber 191 preferably have a relationship such that Eout<Ein in the configuration in FIG. 14. Additionally, the modulus Ein at 100% elongation of the stress relief rubber 191 preferably is within a range such that $4.0 \text{ MPa} \leq Ein \leq 5.5 \text{ MPa}$.

In the configuration of FIG. 14, since the stress relief rubber 191 is disposed on the outer side in the tire width direction of the circumferential reinforcing layer 145, shearing strain of the periphery rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, separation of the peripheral rubber of the circumferential reinforcing layer 145 is suppressed.

Effect

As described above, the pneumatic tire 1 includes the carcass layer 13, the belt layer 14 disposed on the outer side of the carcass layer 13 in the tire radial direction, and the tread rubber 15 disposed on the outer side of the belt layer 14 in the tire radial direction (see FIG. 1). Also, the pneumatic tire 1 includes at least three circumferential main grooves 2 extending in the tire circumferential direction, and the plurality of land portions 3 partitioned and formed by the circumferential main grooves 2. Also, the belt layer 14 is formed by laminating the pair of cross belts 142, 143 having a belt angle, as an absolute value, of not less than 10° and not more than 45° and of mutually opposite signs, and the circumferential reinforcing layer 145 having a belt angle within a range of ±5° with respect to the tire circumferential direction (see FIG. 2). Also, when viewed as a cross-section from the tire meridian direction, when the wear end surface WE of the circumferential main grooves 2 is drawn, the distance Dcc on the tire equatorial plane CL from the circumferential reinforcing layer 145 to the wear end surface WE and the distance De from the end portion of the circumferential reinforcing layer 145 to the wear end surface WE has a relationship such that $1.06 \leq De/Dcc$.

In this configuration, the distances Dcc, De of the circumferential reinforcing layer 145 with respect to the wear end surface WE are made appropriate, so compared with a configuration in which the values of the ratio De/Dcc are substantially equal, the ground contact pressure of the shoulder land portions 3 when the tire makes ground contact is increased. Also, radial growth of the tire in the region to the outer side in the tire width direction of the circumferential reinforcing layer 145 is reduced, so the deformation of the belt layer 14 is suppressed. As a result, exposure of the belt layer 14 during the buffing operation of the used tire is suppressed, which has the advantage that the yield of base tires is increased.

Also, in the pneumatic tire 1, the distance Gcc from the tread profile to the tire inner circumferential surface along the tire equatorial plane CL, and the distance Gsh from the tread edge P to the tire inner circumferential surface have a relationship such that $1.10 \leq Gsh/Gcc$ (see FIG. 2). In this configuration, the shoulder portions with the ratio Gsh/Gcc set large have a thick walled structure, so when the used tires are being retreaded, it is possible to prevent exposure of the belt plies while appropriately ensuring the amount of buffing. This has the advantage that the yield of base tires is increased. Also, the shoulder land portions have a thick walled structure, so, in particular, in cases where the shoulder wear portion of the used tire is extensive also, it is possible to appropriately remove the shoulder wear portion by the buffing process, which is desirable.

Also, in the pneumatic tire 1, the groove depth GDsh and the under-groove gauge UDsh of the left and right circumferential main grooves 2 on the outermost side in the tire width direction (outermost circumferential main grooves) have a relationship such that $0.20 \leq UDsh/GSsh$. In this configuration, the under-groove gauge UDsh of the outermost circumferential main grooves 2 is appropriately ensured, so it is possible to ensure a sufficient amount of buffing so that shoulder wear of the used tire does not remain on the surface of the base tire. This has the advantage that the yield of base tires is increased.

Also, in the pneumatic tire 1, the cross belt 142 on the inner side in the tire radial direction of the pair of cross belts 142, 143 has a wider structure than that of the cross belt 143 on the outer side in the tire radial direction (see FIGS. 2 and 3). As a result, there is the advantage that the durability is ensured, and a hoop effect is efficiently exhibited.

Also, in the pneumatic tire 1, the left and right end portions of the circumferential reinforcing layer 145 are to the outer side in the tire width direction of the left and right circumferential main grooves 2, 2 on the outermost side in the tire width direction (outermost circumferential main grooves) (see FIGS. 1 and 2). In this configuration, the circumferential reinforcing layer 145 is extended to below the groove of the outermost circumferential main grooves 2, so growth of the tire diameter at the outermost circumferential main grooves 2 is suppressed. As a result, the under-groove gauge UDsh of the outermost circumferential main grooves 2 is ensured, and a sufficient amount of buffing is ensured, which has the advantage that the yield of base tires is increased.

Also, in the pneumatic tire 1, the groove depth GDcc and the under-groove gauge UDcc of the circumferential main groove 2 nearest the tire equatorial plane CL have a relationship such that $0.15 \leq UDcc/GDcc$ (see FIG. 5). In this configuration, the under-groove gauge UDcc of the circumferential main groove 2 is appropriately ensured, and it is possible to ensure a sufficient amount of buffing so that shoulder wear of the used tires does not remain on the surface of the base tires. As a result, there is the advantage that the yield of base tires is increased.

Also, in the pneumatic tire 1, the shoulder land portion 3 includes the lug groove 4 that opens to the buttress portion (see FIG. 6). Also, when viewed as a cross-section from the tire meridian direction, when the straight line L1 is drawn parallel to the tire rotational axis from the end portion on the outer side in the tire width direction and on the outermost side in the tire radial direction of the outermost circumferential main groove 2 out of the end portions of the plurality of belt plies 141 to 145 constituting the belt layer 14, the opening end portion 41 of the lug groove 4 is on the outer side in the tire radial direction of the straight line L1. In this configuration, when the opening end portion 41 of the lug groove 4 is used as a mark for determining when to retread the tire, exposure of the end portion of the belt plies on the surface of the base tire during the buffing process is prevented. As a result there is the advantage that the yield of base tires is increased.

Also, in the pneumatic tire 1, when viewed as a cross-section from the tire meridian direction, when the curved line L2 is drawn parallel to the tread profile and passing through the groove bottom of the outermost circumferential main grooves 2, the belt plies 141 to 145 constituting the belt layer 14 are on the inner side in the tire radial direction of the curved line L2 (see FIG. 7). In this way, exposure of the end portion of the belt plies on the surface of the base tire during the buffing process is prevented, which has the advantage that the yield of the base tires is increased.

Also, in the pneumatic tire 1, when the intersection Q is taken between the curved line L2 and the buttress portion, the under-groove gauge UDsh of the outermost circumferential main groove 2 and the distance $\Delta$Drg in the tire radial direction from the intersection Q to the opening end portion 41 of the lug groove 4 have a relationship such that $-1.0 \leq \Delta Drg/UDsh \leq 1.0$ (see FIG. 7), where the outer side in the tire radial direction is positive. In this configuration, when the opening end portion 41 of the lug groove 4 is used as a mark for determining the time to retread the tire, there is the advantage that the position of the opening end portion 41 is made appropriate. In other words, by satisfying the relationship $\Delta Drg/UDsh \leq 1.0$, it is possible to delay the time for retreading the tire, and extend the primary life of the tire. By satisfying the relationship $-1.0 \leq \Delta Drg/UDsh \leq 1.0$, it is possible to accurately determine whether or not the tire can be retreaded.

Also, in the pneumatic tire 1, when viewed as a cross-section from the tire meridian direction, when the straight line L3 is drawn connecting the groove bottom of the outermost circumferential main groove 2 and the opening end portion 41 of the lug groove 4, all the belt plies 141 to 145 constituting the belt layer 14 are on the inner side in the tire radial direction of the straight line L3 (see FIG. 8). In this way, exposure of the end portion of the belt plies on the surface of the base tire during the buffing process is prevented, which has the advantage that the yield of the base tires is increased.

Also, in the pneumatic tire 1, when viewed as a cross-section from the tire meridian direction, when the straight line L4 is drawn connecting the midpoint M of the under-groove gauge UDsh of the outermost circumferential main groove 2 and the opening end portion 41 of the lug groove 4, all the belt plies 141 to 145 constituting the belt layer 14 are on the inner side in the tire radial direction of the straight line L4 (see FIG. 9). In this way, exposure of the end portion of the belt plies on the surface of the base tire during the buffing process is prevented, which has the advantage that the yield of the base tires is increased.

Also, in the pneumatic tire 1, the groove depth GDsh and the under-groove gauge UDsh of the outermost circumferential main groove 2 and the distance Drg in the tire radial direction from the tire ground contact edge T to the opening end portion 41 of the lug groove 4 have a relationship such that $0.7 \leq Drg/(GDsh+UDsh) \leq 1.1$ (see FIG. 6). In this configuration, when the opening end portion 41 of the lug groove 4 is used as a mark for determining the time to retread the tire, the position of the opening end portion 41 is made appropriate. In this way, there is the advantage that it is possible to accurately determine whether or not the tire can be retreaded.

Additionally, in this pneumatic tire 1, the tread width TW and the width Ws of the circumferential reinforcing layer 145 have the relationship satisfying $0.70 \leq Ws/TW \leq 0.90$ (see FIG. 1). In such a configuration, due to the ratio Ws/TW between the tread width TW and the width Ws of the circumferential reinforcing layer 145 being made appropriate, there is an advantage that the amount of deformation of the shoulder land portion 3 when the tire contacts the ground is effectively reduced (see FIG. 4B and FIG. 5). That is, by satisfying the relationship $0.70 \leq Ws/TW$, the width Ws of the circumferential reinforcing layer 145 is appropriately ensured, and the amount of deformation of the shoulder land portion 3 when the tire contacts the ground is reduced. Also, by satisfying the relationship $Ws/TW \leq 0.90$, due to the fact that the deformation of the end portions of each of the belt plies when the tire contacts the ground is suppressed, the strain of the end portions of each of the belt plies is reduced.

Also, in a configuration with a wide circumferential reinforcing layer 145 satisfying a relationship of $0.7 \leq Ws/TW$, there is a large difference in rigidity between the center region including the circumferential reinforcing layer 145 and the shoulder regions on the outside thereof, so shoulder wear tends to occur easily. Therefore, in this configuration, by using the opening end portion 41 of the lug groove 4 as a mark for determining the time for retreading the tire, and making the position of the opening end portion 41 appropriate, there is the advantage that it is possible to obtain a significant improvement effect of the yield of base tires.

Also, in the pneumatic tire 1, the tread width TW and the total tire width SW have a relationship such that $0.70 \leq TW/SW \leq 0.89$ (see FIG. 1). In such a configuration, radial growth in the center region is suppressed due to the belt layer 14 having the circumferential reinforcing layer 145. Furthermore, a difference in radial growths between the center region and a shoulder region is alleviated due to the ratio TW/SW being within the above range. This has the advantage of making the ground contact pressure of the tire uniform. Specifically, the air volume inside the tire is secured and deformation is suppressed due to TW/SW being equal to or greater than 0.79. Moreover, rising of the shoulder portion is suppressed and deformation when the tire makes ground contact is suppressed due to TW/SW being less than or equal to 0.89

Additionally, in the pneumatic tire 1, the tread width TW and a cross-sectional width Wca of the carcass layer 13 have a relationship such that $0.82 \leq TW/Wca \leq 0.92$ (see FIG. 1). In such a configuration, radial growth in the center region is suppressed due to the belt layer 14 having the circumferential reinforcing layer 145. Furthermore, a difference in radial growths between the center region and a shoulder region is alleviated and the ground contact pressure distribution in a tire width direction is made uniform due to the ratio TW/Wca being within the above range. This has the advantage of making the ground contact pressure of the tire uniform. Specifically, the air volume inside the tire is secured and deformation suppressed due to TW/Wca being equal to or greater than 0.82. Moreover, the relationship satisfying $TW/Wca \leq 0.92$ has the advantage of suppressing rising of the shoulder portion to make the ground contact pressure distribution uniform.

Also, in the pneumatic tire 1, the belt cords of the circumferential reinforcing layer 145 are steel wire, and the number of ends in the circumferential reinforcing layer 145 is not less than 17 ends/50 mm and not more than 30 ends/50 mm. As a result, there is an advantage that the number of ends of the belt cords in the circumferential reinforcing layer 145 is made appropriate. Specifically, the strength of the circumferential direction reinforcing layer 145 is appropriately ensured due to number of ends in the circumferential reinforcing layer 145 being at least 17 ends/50 mm. Moreover, the amount of rubber of the coating rubber of the circumferential reinforcing layer 145 is appropriately ensured and separation of the rubber materials between the contiguous belt plies (the pair of cross belts 142, 143 and the circumferential reinforcing layer 145 in FIG. 3) is suppressed due to the number of ends in the circumferential reinforcing layer 145 being not more than 30 ends/50 mm.

In the pneumatic tire 1, the elongation of the belt cords from which the circumferential reinforcing layer 145 is configured when they are components when subjected to a tensile load of 100 N to 300 N is preferably not less than 1.0% and not more than 2.5%. As a result, there is an advantage that the effect of suppressing radial growth in the center region is properly secured due to the circumferential reinforcing layer 145.

In the pneumatic tire 1, elongation is not less than 0.5% and not more than 2.0% when the tensile load of the belt cords as tire components that constitute the circumferential reinforcing layer 145 is from 500 N to 1000 N. As a result, there is an advantage that the effect of suppressing radial growth in the center region is properly secured due to the circumferential reinforcing layer 145.

In the pneumatic tire 1, the circumferential reinforcing layer 145 is disposed inward in the tire width direction of the left and right edges of the narrower cross belt 143 of the pair of cross belts 142, 143 (see FIG. 3). Also, the pneumatic tire 1 includes the stress relief rubber 191 disposed between the pair of cross belts 142, 143 and on the outer side of the circumferential reinforcing layer 145 in the tire width direction so as to be adjacent to the circumferential reinforcing layer 145, and the end portion relief rubber 192 disposed between the pair of cross belts 142, 143 and on the outer side of the stress relief rubber 191 in the tire width direction and at a position corresponding to the edge portion of the pair of cross belts 142, 143 so as to be adjacent to the stress relief rubber 191 (see FIG. 14). In such a configuration, there is an advantage that fatigue rupture of the peripheral rubber at the edge portion of the circumferential reinforcing layer 145 is suppressed due to the circumferential reinforcing layer 145 being disposed on the inner side in the tire width direction from the left and right edge portions of the narrower cross belt 143 of the pair of cross belts 142, 143. Since the stress relief rubber 191 is disposed on the outer side of the circumferential reinforcing layer 145 in the tire width direction, shearing strain of the peripheral rubber between the edge portion of the circumferential reinforcing layer 145 and the cross belts 142, 143 is alleviated. Moreover, since the end portion relief rubber 192 is disposed at a position corresponding to the edge portions of the cross belts 142, 143, shearing strain of the peripheral rubbers at the edge portions of the cross belts 142, 143 is alleviated. Accordingly, there is an advantage that separation of the peripheral rubber of the circumferential reinforcing layer 145 is suppressed.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying Ein<Eco. As a result, there is an advantage that the modulus Ein of the stress relief rubber 191 is made appropriate and the shearing strain of the peripheral rubber between the edge portion of the circumferential reinforcing layer 145 and the cross belts 142, 143 is alleviated.

Furthermore, in the pneumatic tire 1, the modulus Ein at 100% elongation of the stress relief rubber 191 and the modulus Eco at 100% elongation of the coating rubber of the pair of cross belts 142, 143 have a relationship satisfying $0.6 \leq Ein/Eco \leq 0.9$. As a result, there is an advantage that the ratio Ein/Eco is made appropriate and the shearing strain of the peripheral rubber between the edge portion of the circumferential reinforcing layer 145 and the cross belts 142, 143 is alleviated.

Additionally, in the pneumatic tire 1, the modulus Ein at 100% elongation of the stress relief rubber 191 is in ranges such that $4.0 \text{ MPa} \leq Ein \leq 5.5 \text{ MPa}$ (see FIG. 14). As a result, there is an advantage that the modulus Ein of the stress relief rubber 191 is made appropriate and the shearing strain of the peripheral rubber between the edge portion of the circumferential reinforcing layer 145 and the cross belts 142, 143 is alleviated.

In the pneumatic tire 1, the circumferential reinforcing layer 145 is disposed inward in the tire width direction of the left and right edges of the narrower cross belt 143 of the pair of cross belts 142, 143 (see FIG. 3). Also, the width Wb3 of the narrower cross belt 143 and the distance S from the edge portion of the circumferential reinforcing layer 145 to the edge portion of the narrower cross belt 143 are in a range of $0.03 \leq S/Wb3 \leq 0.12$. This has the advantage of providing an appropriate positional relationship S/Wb3 between the edge portions of the cross belts 142, 143 and the edge portions of the circumferential reinforcing layer 145. Specifically, the relationship satisfying $0.03 \leq S/Wb3$ ensures an appropriate distance between the end portions of the circumferential reinforcing layer 145 and the end portions of the cross belt 143 to suppress the separation of the peripheral rubbers at the end portions of these belt plies 145, 143. Additionally, the relationship satisfying $S/Wb3 \leq 0.12$ ensures the width Ws of the circumferential reinforcing layer 145 relative to the width Wb3 of the cross belt 143 to ensure an appropriate hoop effect from the circumferential reinforcing layer 145.

Target of Application

The pneumatic tire 1 is preferably applied to a heavy duty tire with an aspect ratio of not less than 40% and not more than 70% when mounted on a regular rim, inflated with a regular internal pressure and a regular load is applied. A heavy duty tire has a higher load under use than a passenger car tire. As a result, the difference in the diameters between the disposition region of the circumferential reinforcing layer 145 in the tread surface and the region on the outer side in the tire width direction from the circumferential reinforcing layer 145 may easily increase. Moreover, a footprint having an hourglass shape occurs easily in the tire having the above-mentioned low aspect ratio. Therefore, by applying the present technology to such heavy duty tires, the significant tire performance as described above can be obtained.

EXAMPLES

FIGS. 15A to 16B are tables showing the results of performance testing of pneumatic tires according to the embodiment of the present technology.

In these performance tests, evaluation was carried out on several different pneumatic tires for yield of base tires (see FIGS. 15A to 16B). In this evaluation, pneumatic tires having a tire size of 315/60 R22.5 were mounted on a rim having a rim size of 22.5×9.00 and inflated with 900 kPa of air pressure. The test vehicle, a 4×2 tractor-trailer to which the pneumatic tires were mounted, was driven, and the results for 100 tires of each specification that were worn to the opening of the lug groove of the shoulder land portion were extracted. Then, these tires were subjected to the buffing process, exposure of the belt plies and the remains of the groove bottom line of the circumferential main grooves on the surface of the base tire were observed, and it was determined whether or not the tires could be retreaded. A larger numerical value is preferable in the evaluations. In particular, an evaluation of 80% or greater indicates a result having sufficiently superior to the Conventional Example, and an evaluation of 85% or higher indicates a result having dramatic superiority over that of the Conventional Example.

The pneumatic tires 1 of Working Example 1 had the configuration illustrated in FIGS. 1 to 3. Also, the main dimensions were set to TW=275 mm, Gcc=32.8 mm, GDcc=13.0 mm, and GDsh=13.5 mm. Also, as shown in FIG. 15, each of the belt plies 141 to 145 of the belt layer 14 is on the inner side in the tire radial direction of the imaginary line L2 drawn from the groove bottoms of the outermost circumferential main grooves 2. The pneumatic tires 1 of Working Examples 2 to 26 are modified examples of the pneumatic tire 1 of Working Example 1.

In the configuration of FIGS. 1 to 3, the pneumatic tire of the Conventional Example is not provided with a circumferential reinforcing layer.

As can be seen from the test results, the tire belt-edge-separation resistance performance and the yield of base tires are increased in the pneumatic tires according to Working Examples 1 to 26. Also, comparing Working Examples 1 and 2, it can be seen that by satisfying the relationships $1.06 \leq De/Dcc$ and $1.20 \leq Gsh/Gcc$, a superior result (evaluation 85% or higher) can be obtained for the belt-edge-separation resistance performance.

What is claimed is:

1. A pneumatic tire comprising:
a carcass layer;
a belt layer disposed on an outer side in a tire radial direction of the carcass layer;
a tread rubber disposed on an outer side in the tire radial direction of the belt layer;
at least three circumferential main grooves extending in a tire circumferential direction; and
a plurality of land portions partitioned and formed by the circumferential main grooves, the belt layer being formed by laminating a pair of cross belts having a belt angle, as an absolute value, of not less than 10° and not more than 45° and of mutually opposite signs, and a circumferential reinforcing layer having a belt angle within a range of ±5° with respect to the tire circumferential direction, and
when viewed as a cross-section from a tire meridian direction, when a wear end surface WE of the circumferential main grooves is drawn, a distance Dec on a tire equatorial plane CL from the circumferential reinforcing layer to the wear end surface WE and a distance De from an end portion of the circumferential reinforcing layer to the wear end surface WE have a relationship such that $1.06 \leq De/Dec$; wherein
a distance Gee from a tread profile to a tire inner circumferential surface at the tire equatorial plane and a distance Gsh from a tread edge to the tire inner circumferential surface have a relationship such that $1.25 \leq Gsh/Gcc$; and
a distance Hee from the circumferential reinforcing layer to a tread profile on a tire equatorial plane and a distance He from an end portion of the circumferential reinforcing layer to the tread profile have a relationship such that $0.90 \leq He/Hee \leq 0.94$.

2. The pneumatic tire according to claim 1, wherein the cross belt on an inner side in a tire width direction of the pair of cross belts has a wider structure than the cross belt on the outer side in the tire radial direction.

3. The pneumatic tire according to claim 1, wherein left and right end portions of the circumferential reinforcing layer are on the outer side in a tire width direction of left and right circumferential main grooves on an outermost side in the tire width direction.

4. The pneumatic tire according to claim 1, wherein when left and right circumferential main grooves on the outermost side in a tire width direction out of the circumferential main grooves are outermost circumferential main grooves, and when the land portions on the outer side in the tire width direction of the left and right outermost circumferential main grooves are shoulder land portions, the shoulder land portions include a lug groove that opens to a buttress portion, and when viewed as a cross-section from the tire meridian direction, when a straight line L1 is drawn parallel to a tire rotational axis from an end portion on the outer side in the tire width direction of the outermost circumferential main groove and on an outermost side in the tire radial direction out of the end portions of a plurality of belt plies constituting the belt layer, an opening end portion of the lug groove is on the outer side in the tire radial direction of the straight line L1.

5. The pneumatic tire according to claim 1, wherein when viewed as a cross-section from the tire meridian direction, when a curved line L2 is drawn parallel to a tread profile and passing through a groove bottom of an outermost circumferential main groove, all belt plies constituting the belt layer are on an inner side in the tire radial direction of the curved line L2.

6. The pneumatic tire according to claim 5, wherein shoulder land portions include a lug groove that opens to a buttress portion, and when an intersection Q is taken between the curved line L2 and the buttress portion, an under-groove gauge UDsh of outermost circumferential main grooves and a distance 11 Drg in the tire radial direction from the intersection Q to an opening end portion of the lug groove have a relationship such that $-1.0 \leq 11Drg/UDsh \leq 1.0$.

7. The pneumatic tire according to claim 1, wherein shoulder land portions include a lug groove that opens to a buttress portion, and when viewed as a cross-section from the tire meridian direction, when a straight line L3 is drawn connecting a groove bottom of an outermost circumferential main groove and an opening end portion of the lug groove, all belt plies constituting the belt layer are on an inner side in the tire radial direction of the straight line L3.

8. The pneumatic tire according to claim 1, wherein shoulder land portions include a lug groove that opens to a buttress portion, and when viewed as a cross-section from the tire meridian direction, when a straight line L4 is drawn connecting a midpoint M of an under-groove gauge UDsh of an outermost circumferential main groove and an opening end portion of the lug groove, all belt plies constituting the belt layer are on an inner side in the tire radial direction of the straight line L4.

9. The pneumatic tire according to claim 7, wherein the shoulder land portions include a lug groove that opens to a buttress portion, and a groove depth GDsh and an under-groove gauge UDsh of the outermost circumferential main groove and a distance Drg in the tire radial direction from a tire ground contact edge T to the opening end portion of the lug groove have a relationship such that $0.7 \leq Drg/(GDsh+UDsh) \leq 1.1$.

10. The pneumatic tire according to claim 1, wherein a tread width TW and a total tire width SW have a relationship such that $0.79 \leq TW/SW \leq 0.89$.

11. The pneumatic tire according to claim 1, wherein a tread width TW and a cross-sectional width Wca of the carcass layer have a relationship such that $0.82 \leq TW/Wca \leq 0.92$.

12. The pneumatic tire according to claim 1, wherein belt cords of the circumferential reinforcing layer are steel wire and a number of ends in the circumferential reinforcing layer is not less than 17 ends/50 mm and not more than 30 ends/50 mm.

13. The pneumatic tire according to claim 1, wherein elongation is not less than 1.0% and not more than 2.5% when a tensile load of belt cords as components that constitute the circumferential reinforcing layer is from 100 N to 300 N.

14. The pneumatic tire according to claim 1, wherein elongation is not less than 0.5% and not more than 2.0% when a tensile load of belt cords as cured tire components that constitute the circumferential reinforcing layer is from 500 N to 1000 N.

15. The pneumatic tire according to claim 1, wherein the circumferential reinforcing layer is disposed on an inner side in a tire width direction from left and right edge portions of a narrower cross belt of the pair of cross belts, and further comprising: a stress relief rubber disposed between the pair of cross belts and disposed on the outer side of the circumferential reinforcing layer in the tire width direction so as to be adjacent to the circumferential reinforcing layer; and an end portion relief rubber disposed between the pair of cross belts and disposed on an outer side of the stress relief rubber in the tire width direction and in a position corresponding to an edge portion of the pair of cross belts, the end portion relief rubber being adjacent to the stress relief rubber.

16. The pneumatic tire according to claim 15, wherein a modulus Ein at 100% elongation of the stress relief rubber and a modulus Eco at 100% elongation of coating rubber of the pair of cross belts have a relationship such that Ein<Eco.

17. The pneumatic tire according to claim 15, wherein a modulus Ein at 100% elongation of the stress relief rubber and a modulus Eco at 100% elongation of coating rubber of the pair of cross belts have a relationship such that $0.6 \leq Ein/Eco \leq 0.9$.

18. The pneumatic tire according to claim 15, wherein a modulus Ein at 100% elongation of the stress relief rubber is within a range of $4.0 \text{ MPa} \leq Ein > 5.5 \text{ MPa}$.

19. The pneumatic tire according to claim 1, wherein the circumferential reinforcing layer is disposed on an inner side in a tire width direction from left and right edge portions of a narrower cross belt of the pair of cross belts, and further comprising: a width Wb3 of the narrower cross belt and a distance S from an edge portion of the circumferential reinforcing layer to an edge portion of the narrower cross belt are within a range of $0.03 \leq S/Wb3$.

20. The pneumatic tire according to claim 1 applied to a heavy duty tire with an aspect ratio of 70% or less.

21. The pneumatic tire according to claim 1, wherein the distance Dec and the distance De have the relationship such that $1.11 \leq De/Dec$.

22. The pneumatic tire according to claim 1, wherein a groove depth GDsh and an under-groove gauge UDsh of left and right circumferential main grooves on an outermost side in a tire width direction have a relationship such that $0.20 \leq UDsh/GDsh \leq 0.7$.

23. The pneumatic tire according to claim 1, wherein a groove depth GDcc and an under-groove gauge UDcc of the circumferential main groove nearest the tire equatorial plane have a relationship such that $0.15 \leq UDcc/GDcc \leq 0.7$.

24. The pneumatic tire according to claim 1, wherein a tread width TW and a width Ws of the circumferential reinforcing layer have a relationship such that $0.81 \leq Ws/TW \leq 0.90$.

25. The pneumatic tire according to claim 1, wherein a groove depth GDsh of the outermost circumferential main grooves and a groove depth GDcc of the circumferential main groove near a tire equatorial plane have a relationship such that $1.1 \leq GDsh/GDcc \leq 1.2$.

26. The pneumatic tire according to claim 1, wherein a distance Hee from the circumferential reinforcing layer to a tread profile on a tire equatorial plane and a distance He from an end portion of the circumferential reinforcing layer to the tread profile have a relationship such that $0.90 He/Hee \leq 0.94$.

27. The pneumatic tire according to claim 1, wherein a width Wb2 of the wider cross belt and a cross-sectional width Wca of the carcass layer have a relationship such that $0.74 \leq Wb2/Wca \leq 0.89$.

28. The pneumatic tire according to claim 1, wherein a width Wb3 of the narrower cross belt and a width W s of the circumferential reinforcing layer have a relationship such that $0.75 \leq Ws/Wb3 \leq 0.9$.

29. The pneumatic tire according to claim 1, wherein: a width Wb2 of the wider cross belt and a cross-sectional width W ca of the carcass layer have a relationship such that $0.74 \leq Wb2/Wca \leq 0.89$; and a width W s of the circumferential reinforcing layer and the cross-sectional width Wca have a relationship such that $0.60 \leq Ws/Wca \leq 0.70$.

\* \* \* \* \*

UNITED STATES PATENT AND TRADEMARK OFFICE
CERTIFICATE OF CORRECTION

PATENT NO. : 10,239,353 B2
APPLICATION NO. : 14/655650
DATED : March 26, 2019
INVENTOR(S) : Takanori Ito It is certified that error appears in the above-identified patent and that said Letters Patent is hereby corrected as shown below:

In the Claims

Column 26, Line 42, Claim 27, it says "Wea", which should be corrected to "Wca". Column 26, Lines 45 and 51, Claims 28-29, "a width W s" should be "a width Ws".

Signed and Sealed this
Twentieth Day of August, 2019

Andrei Iancu
*Director of the United States Patent and Trademark Office*